(12) United States Patent
Ichida

(10) Patent No.: US 11,063,272 B2
(45) Date of Patent: Jul. 13, 2021

(54) SUPPORT FRAME FOR FUEL CELL AND VEHICLE

(71) Applicant: TOYOTA JIDOSHA KABUSHIKI KAISHA, Toyota (JP)

(72) Inventor: Yugo Ichida, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 16/672,647

(22) Filed: Nov. 4, 2019

(65) Prior Publication Data
US 2020/0161672 A1    May 21, 2020

(30) Foreign Application Priority Data

Nov. 15, 2018 (JP) .............................. JP2018-214259

(51) Int. Cl.
| | | |
|---|---|---|
| *B60K 1/04* | (2019.01) | |
| *H01M 8/0273* | (2016.01) | |
| *B60L 50/72* | (2019.01) | |

(52) U.S. Cl.
CPC ............ *H01M 8/0273* (2013.01); *B60K 1/04* (2013.01); *B60L 50/72* (2019.02); *B60K 2001/0411* (2013.01); *B60K 2001/0416* (2013.01); *H01M 2250/20* (2013.01)

(58) Field of Classification Search
CPC ......... B60L 50/72; B60K 1/04; H01M 8/0273
See application file for complete search history.

(56) References Cited

U.S. PATENT DOCUMENTS

| | | | | |
|---|---|---|---|---|
| 7,966,945 | B1* | 6/2011 | Miller ...................... | B61C 7/04 |
| | | | | 105/49 |
| 8,563,195 | B2* | 10/2013 | Sabapathy .......... | H01M 8/2475 |
| | | | | 429/507 |
| 10,494,034 | B2* | 12/2019 | Makowski ............ | H01M 50/20 |
| 2005/0029022 | A1* | 2/2005 | Kubusch ................ | B60L 58/33 |
| | | | | 429/513 |
| 2005/0158606 | A1* | 7/2005 | Xia ...................... | H01M 8/247 |
| | | | | 429/469 |
| 2006/0177722 | A1* | 8/2006 | Inagaki ................. | H01M 8/249 |
| | | | | 429/434 |

(Continued)

FOREIGN PATENT DOCUMENTS

JP    2017-074819 A    4/2017

*Primary Examiner* — John D Walters
*Assistant Examiner* — James J Triggs
(74) *Attorney, Agent, or Firm* — Dickinson Wright, PLLC

(57) ABSTRACT

A support frame includes a first member, a second member, and a third member each having a surface. The first member is connected to the second member by fitting, and the first member is connected to the third member by fitting. In each of connecting portions, one of members connected to each other is defined as a first connecting member and the other one of the members is defined as a second connecting member. A side end portion of the first connecting member on a side facing the second connecting member is provided with an extending portion. The extending portion has a flat shape, and the extending portion is provided with a fitted portion constituted by a recessed portion. A side end portion of the second connecting member on a side facing the first connecting member is provided with a fitting portion configured to fit in the fitted portion.

8 Claims, 14 Drawing Sheets

(56) References Cited

U.S. PATENT DOCUMENTS

| | | | |
|---|---|---|---|
| 2007/0007060 A1* | 1/2007 | Ono | B62D 25/2036 180/65.31 |
| 2007/0215397 A1* | 9/2007 | Suzuki | B60K 1/00 180/65.31 |
| 2017/0101031 A1 | 4/2017 | Ohashi | |

* cited by examiner

SUPPORT FRAME FOR FUEL CELL AND VEHICLE

INCORPORATION BY REFERENCE

The disclosure of Japanese Patent Application No. 2018-214259 filed on Nov. 15, 2018 including the specification, drawings and abstract is incorporated herein by reference in its entirety.

BACKGROUND

1. Technical Field

This disclosure relates to a support frame for a fuel cell and a vehicle.

2. Description of Related Art

For example, Japanese Unexamined Patent Application Publication No. 2017-074819 (JP 2017-074819 A) describes a support frame on which a fuel cell to be provided in a vehicle is placed. In the technique described in JP 2017-074819 A, in order to restrain an impact at the time of a vehicle collision from being directly applied to a fuel cell, the support frame is provided with a part projecting forward in the vehicle front-rear direction from a fuel cell stack.

SUMMARY

The support frame that supports the fuel cell might upsize depending on the size of the fuel cell to be placed on the support frame. However, in a case where the support frame with a large size is constituted by an integrated member manufactured by extrusion molding or the like of a metallic material, for example, it is difficult to manufacture a manufacturing apparatus suitable for that size, and this might require a great cost. Further, in a case where such an integrated member is manufactured by casting, it is not easy to satisfy a demanded strength condition because a casting tends not to have high toughness in comparison with an integrated member manufactured by other manufacturing methods. It is desirable that a support frame that supports a fuel cell in a vehicle be manufactured easily with a high strength regardless of its size.

The technique of this disclosure is achievable in the following aspects.

A first aspect provides a support frame used in a vehicle equipped with a fuel cell and configured to support the fuel cell. The support frame includes a first member, a second member, and a third member. The first member has a surface constituting a part of a mounting surface on which the fuel cell is to be placed, the surface extending along a first direction and a second direction perpendicular to the first direction. The second member is joined to a first side of the first member in the second direction, the second member having a surface constituting a part of the mounting surface and extending along the first direction and the second direction. The third member is joined to a second side of the first member in the second direction, the third member having a surface constituting a part of the mounting surface and extending along the first direction and the second direction. A position where the first member is connected to the second member and a position where the first member is connected to the third member are defined as connecting portions. In the connecting portions, the first member is structurally connected to the second member by fitting in a direction along the second direction, and the first member is structurally connected to the third member by fitting in the direction along the second direction. One of members connected to each other in each of the connecting portions is defined as a first connecting member and the other one of the members is defined as a second connecting member. A side end portion of the first connecting member on a side facing the second connecting member is provided with an extending portion. The extending portion has a flat shape extending along the first direction and the second direction and overlaps with a part of the second connecting member in a third direction perpendicular to the first direction and the second direction. The extending portion includes a fitted portion constituted by a recessed portion formed by cutting a part of the extending portion along the second direction. A side end portion of the second connecting member on a side facing the first connecting member is provided with a fitting portion configured to fit in the fitted portion in the direction along the second direction.

With the support frame of the present aspect, the support frame can be formed by connecting a plurality of divided members by fitting of the members in the direction along the second direction. Accordingly, even if the support frame upsizes, the support frame can be easily manufactured. Further, a structure in which the extending portion of the first connecting member overlaps with a part of the second connecting member in the third direction and a structure in which the fitting portion fits in the fitted portion increase the strength of the support frame. Particularly, due to the engagement between the fitted portion and the fitting portion in the connecting portion, the strength of the support frame in the first direction is increased. This accordingly restrains the first member from being displaced in a direction along the first direction from the second member and the third member at the time of a collision or the like of the vehicle. Further, the fitted portion constituting a fitting structure in the connecting portion can be easily constituted by a recessed portion in a shape obtained by cutting the flat-shaped extending portion. This makes it possible to simplify the manufacturing process of the support frame.

In the support frame of the above aspect, the fitted portion may include a first locking surface facing toward the first direction. The fitting portion may include a second locking surface facing the first locking surface in the first direction. A width of the fitted portion in the first direction may be larger than a width of the fitting portion in the first direction. The first connecting member may be joined to the second connecting member in a state where the first locking surface makes contact with the second locking surface.

In the support frame of the present aspect, due to a difference in width between the fitted portion and the fitting portion, the fitting portion can easily fit in the fitted portion, thereby making it possible to simplify the assembly of the support frame. Further, the first locking surface makes contact with the second locking surface. Accordingly, even if the support frame receives an impact in a direction directed from the second locking surface toward the first locking surface, it is possible to restrain displacement in this direction between the first connecting member and the second connecting member. This accordingly restrains such a situation that a joining portion between the members is broken due to the displacement between the members.

In the support frame of the above aspect, the extending portion may be a first extending portion. The side end portion of the first connecting member on the side facing the second connecting member may be further provided with a second extending portion. The second extending portion may be aligned with the first extending portion in the third direction and have a flat shape extending along the first direction and the second direction. The second connecting member may include a pair of side wall portions provided on the opposite sides of the fitting portion in the first direction, the side wall portions being configured to fit between the first extending portion and the second extending portion and facing a peripheral part of the fitted portion in the third direction. The fitting portion may have stepped surfaces projecting from the side wall portions along the third direction. The fitted portion may have an inner peripheral surface facing a part of the stepped surfaces in the first direction.

In the support frame of the present aspect, the side wall portions fit between a pair of extending portions, so that the connecting members are connected more closely, thereby increasing the strength of the support frame. Further, the fitting portion can be easily constituted as a part projecting from a pair of side wall portions.

In the support frame of the above aspect, a thickness of the first extending portion in the third direction may be equal to a height of the stepped surfaces relative to the side wall portions in the third direction.

With the support frame of the present aspect, it is possible to restrain a step projecting in the third direction from being formed in a boundary between the fitting portion and the fitted portion. This accordingly makes it possible to restrain such a situation that the support frame is damaged due to a component placed around the fuel cell being caught in such a step at the time of a collision or the like of the vehicle.

In the support frame of the present aspect, the side end portion of the second connecting member on the side facing the first connecting member may be provided with a cover wall portion. The cover wall portion may have a plate shape extending along the first direction and the second direction and overlap with the extending portion in the third direction such that the cover wall portion covers the extending portion and the fitted portion. The fitting portion may have a wall surface intersecting with the cover wall portion and extending along the second direction and the third direction, and may be constituted by a fitting wall portion. The fitted portion may have an inner peripheral surface facing a part of the wall surface of the fitting wall portion in the first direction.

With the support frame of the present aspect, the fitting portion can be easily achieved by the fitting wall portion.

In the support frame of the above aspect, a root part of the extending portion may be provided with a stepped portion facing a distal surface of the cover wall portion in the second direction and having a height equal to a thickness of the cover wall portion in the third direction.

With the support frame of the present aspect, it is possible to restrain a step projecting along the third direction from being formed in a boundary between the cover wall portion and a base end of the extending portion. This accordingly makes it possible to restrain such a situation that the support frame is damaged due to a component placed around the fuel cell being caught in such a step at the time of a collision or the like of the vehicle.

In the support frame of the above aspect, an additional member constituting a part of the mounting surface and having an upper wall surface extending along the first direction and the second direction may be connected to at least either of a side of the second member, the side opposite to a side facing the first member, and a side of the third member, the side opposite to a side facing the first member.

With the support frame of the present aspect, it is possible to easily change the dimension of the support frame by the additional member.

A second aspect is provided as a vehicle. The vehicle includes the support frame according to any one of the above aspects, and the fuel cell. The support frame is placed at a position close to a front side or a rear side of the vehicle such that the first direction corresponds to a front-rear direction of the vehicle, and the second direction corresponds to a right-left direction of the vehicle. The fuel cell is fixed, on the mounting surface, at a position inwardly from ends of the support frame in the first direction and the second direction.

With the vehicle of the present aspect, it is possible to protect the fuel cell by the support frame. The technique of this disclosure is achievable in various forms other than the support frame and the vehicle. For example, the technique of this disclosure is achievable in forms of a member constituting a support frame, a manufacturing method for a support frame or a vehicle, a method for supporting a fuel cell by a support frame, a support structure for a fuel cell, and so on.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. First Embodiment

Figure 1:
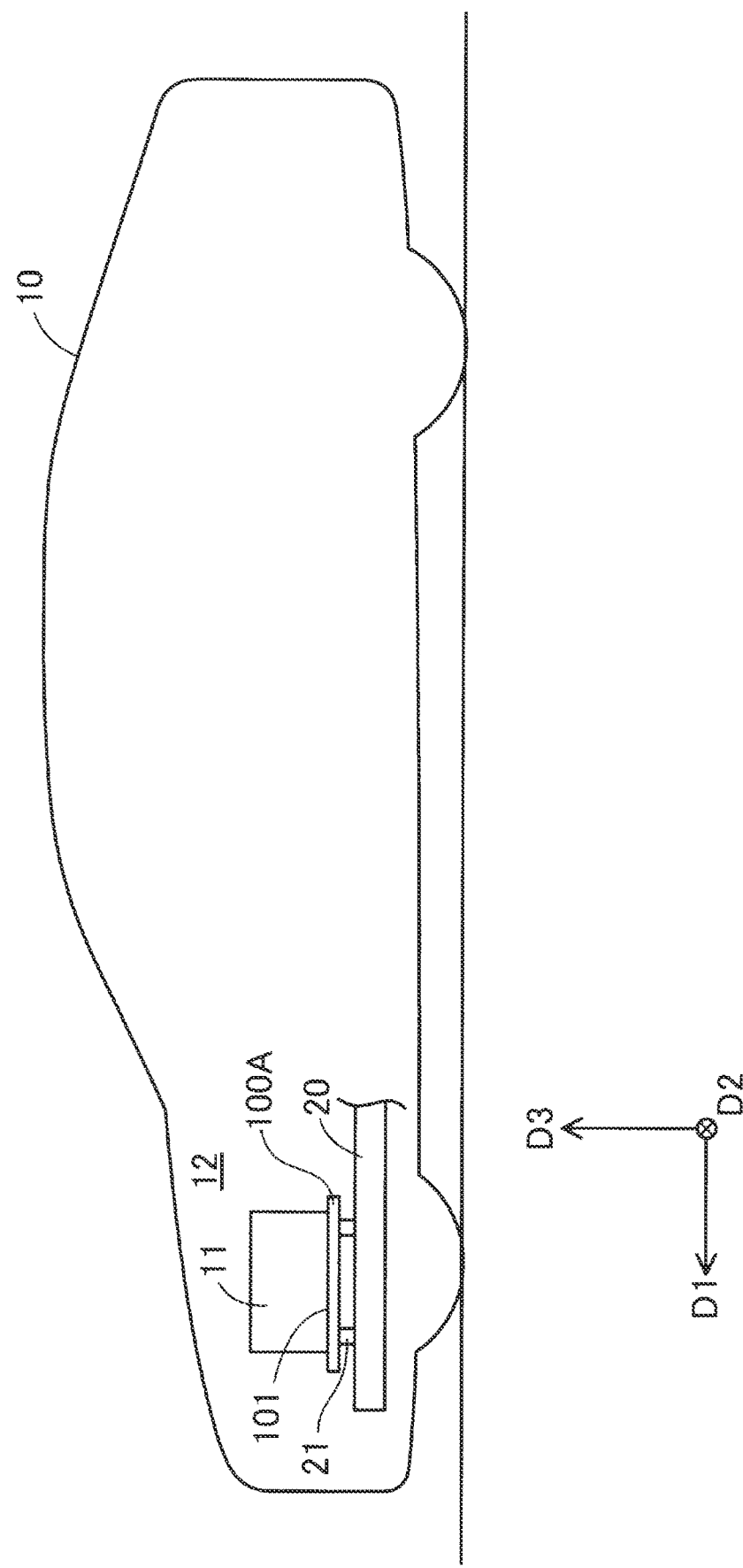
FIG. 1 is a schematic view illustrating a configuration of a vehicle including a support frame according to a first embodiment.

FIG. 1 is a schematic view illustrating a configuration of a vehicle 10 including a support frame 100A in a first embodiment. The vehicle 10 includes a fuel cell 11. The fuel cell 11 is supported by the support frame 100A and generates electric power by an electrochemical reaction of reactant gases. In the first embodiment, the fuel cell 11 is a solid polymer fuel cell. Note that the fuel cell 11 is not limited to the solid polymer fuel cell, and various types of fuel cells can be employed as the fuel cell 11. For example, as the fuel cell 11, a solid oxide fuel cell may be employed. In the vehicle 10, electric power generated by the fuel cell 11 is supplied to a motor as a driving force source for the vehicle 10 or other accessories and electrical components of the vehicle 10. The electric power generated by the fuel cell 11 may be used for power supply to outside. Note that the vehicle 10 is provided with a gas supply portion configured to supply a reactant gas to the fuel cell 11, a secondary battery in which electric power generated by the fuel cell 11 is stored, the secondary battery being used as a power source as well as the fuel cell 11, and so on, but illustration and detailed descriptions of them are omitted herein.

In the first embodiment, the support frame 100A is provided inside a front room 12 placed at a position close to the front side of the vehicle 10. The front room 12 is placed in front of a vehicle cabin in which an occupant is seated. The vehicle 10 includes a pair of vehicle frames 20 constituting a framework of the vehicle 10 in the front room 12. The vehicle frames 20 are provided on the right and left sides of the vehicle 10 and placed along the front-rear direction. The support frame 100A is fixed on the vehicle frames 20 via a fixing portion 21. The fixing portion 21 may be provided with a damping mechanism configured to restrain transmission of vibration from the vehicle frames 20 to the support frame 100A.

The support frame 100A has a flat shape and includes a mounting surface 101 on which the fuel cell 11 is placed. In the present specification, "flat shape" indicates a shape having two plate surfaces extending along two directions perpendicular to each other and facing each other, and a thickness of the shape that is a dimension between the two plate surfaces is smaller than dimensions of the shape along the two directions. Note that "two plate surfaces" are not necessarily perfect flat surfaces and can be grasped as surfaces as a whole. The surfaces may be curved, and an uneven structure, a through-hole, a cut line, and the like may be formed on the surfaces. The uneven structure includes a projection portion, a recessed portion, a groove, a step, and the like, for example. The fuel cell 11 is fixed to the mounting surface 101 of the support frame 100A by fixing members such as bolts, for example, in a state where the fuel cell 11 is stored in a case or the like, for example.

In FIG. 1, arrows D1, D2, D3 indicating three directions perpendicular to each other are illustrated so as to correspond to the support frame 100A. In the following description, respective directions indicated by the arrows D1, D2, D3 are referred to as "first direction D1," "second direction D2," and "third direction D3." The first direction D1 and the second direction D2 are directions along the mounting surface 101 of the support frame 100A. The third direction D3 is a direction perpendicular to the mounting surface 101 and corresponds to a thickness direction of the support frame 100A. The arrows D1, D2, D3 are illustrated in other figures (referred to later) so as to correspond to FIG. 1. Note that a direction "along" the first direction D1 includes the first direction D1 and its reverse direction. This also applies to a direction along the second direction D2 and a direction along the third direction D3.

In the vehicle 10, the support frame 100A is placed such that the first direction D1 corresponds to the front-rear direction of the vehicle 10, the second direction D2 corresponds to the right-left direction of the vehicle 10, and the third direction D3 corresponds to the height direction of the vehicle 10. More specifically, the first direction D1 corresponds to a direction directed from the rear side to the front side in the vehicle 10, the second direction D2 corresponds to a direction directed from the left side to the right side in the vehicle 10, and the third direction D3 corresponds to a direction directed from the lower side to the upper side in the vehicle 10. In the following description, "front side" indicates the first direction D1, and "rear side" indicates the reverse direction from the first direction D1. Also, "right side" indicates the second direction D2 side, and "left side" indicates the reverse side from the second direction D2. Further, "upper side" indicates the third direction D3, and "lower side" indicates the reverse direction from the third direction D3.

Figure 2:
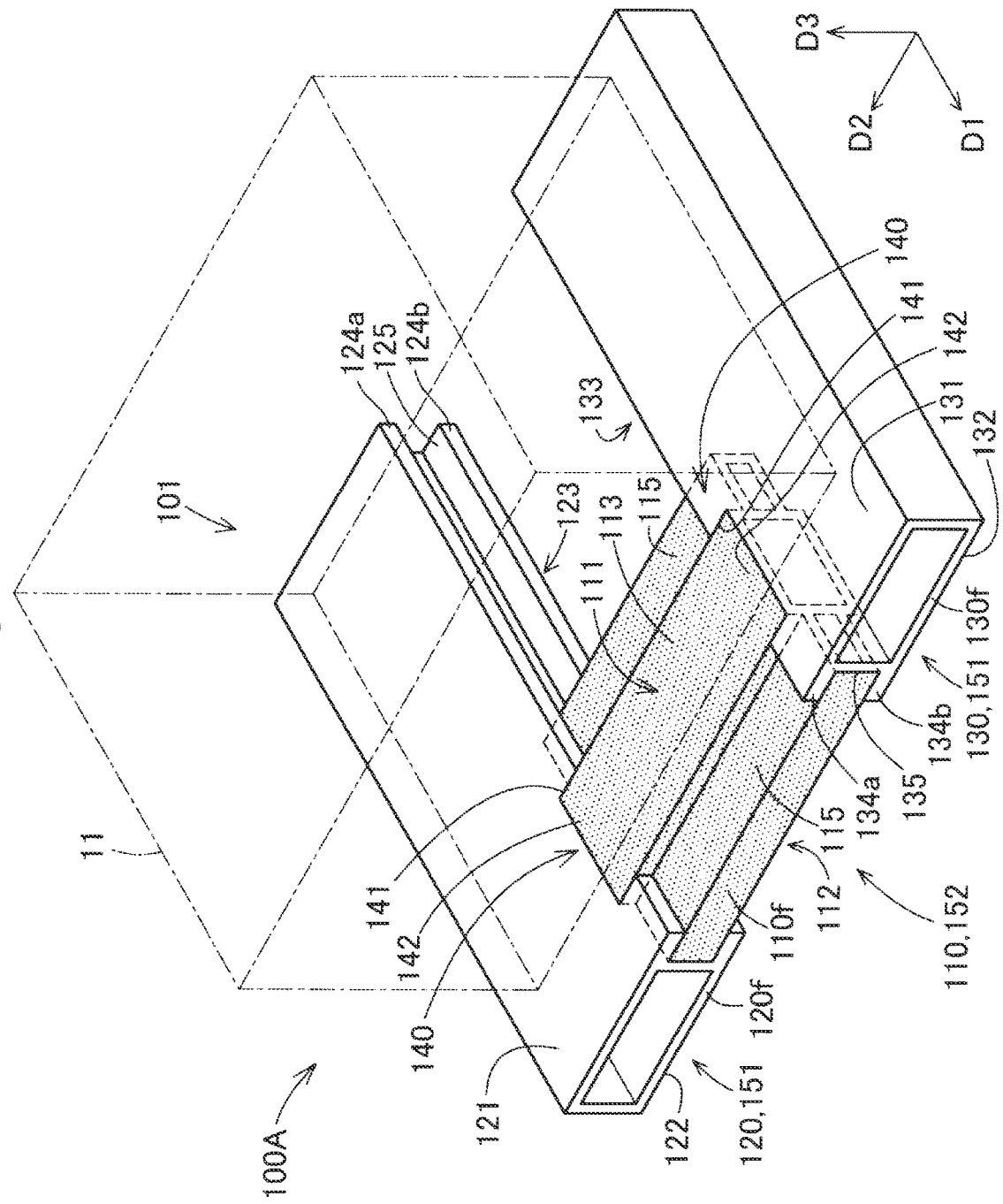
FIG. 2 is a schematic perspective view of the support frame according to the first embodiment.
Figure 3:
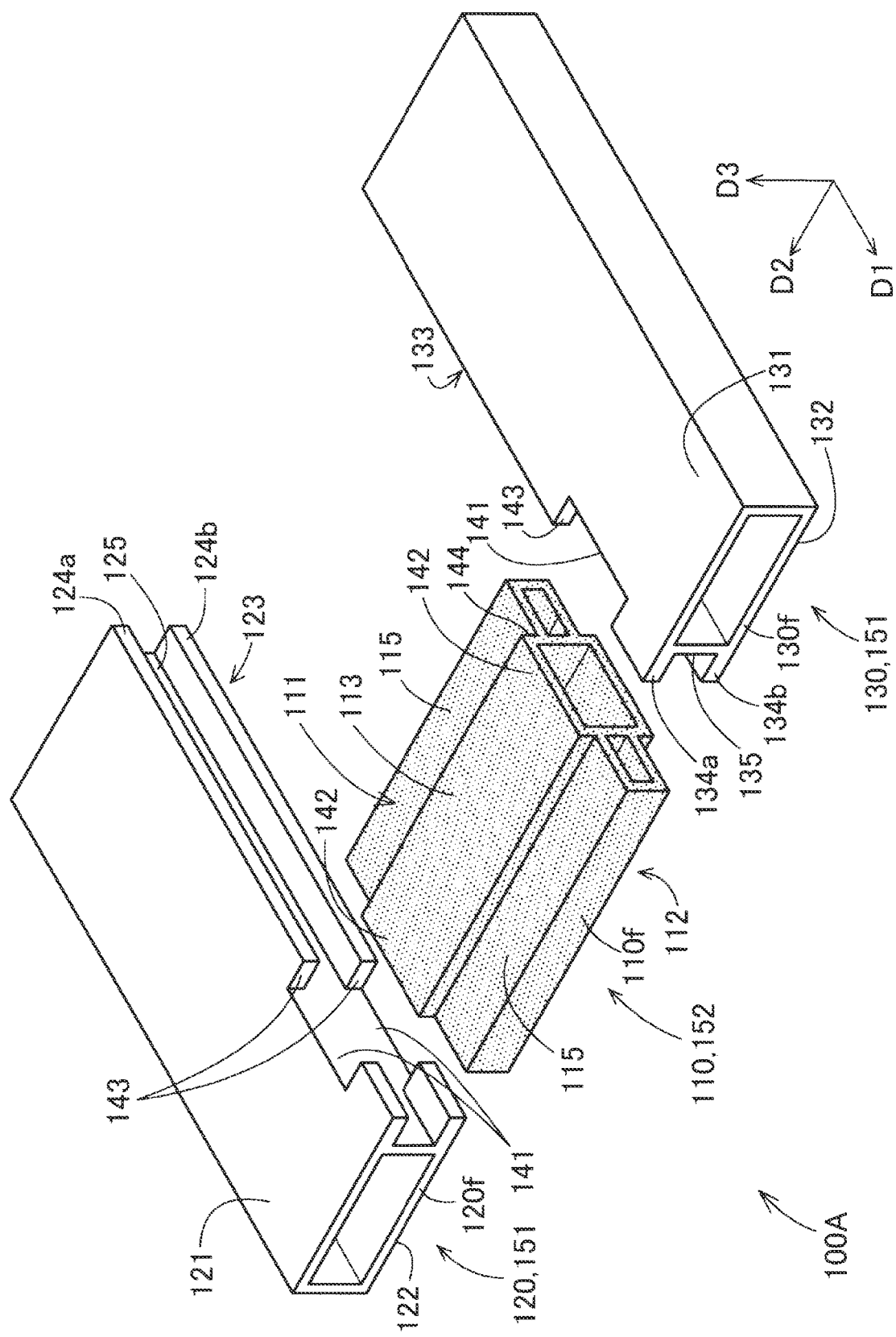
FIG. 3 is a schematic exploded perspective view of the support frame according to the first embodiment.
Figure 4:
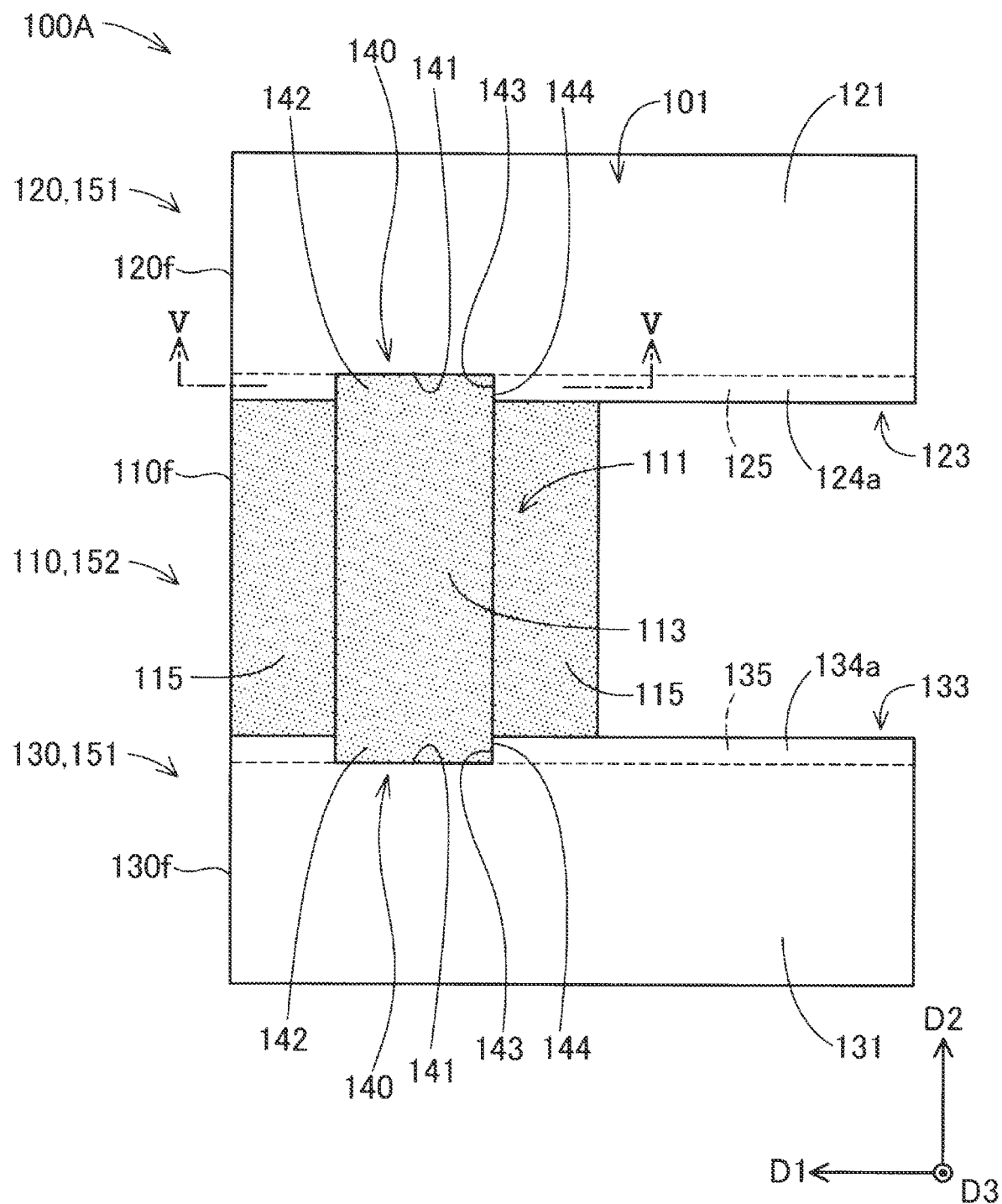
FIG. 4 is a schematic plan view of the support frame according to the first embodiment.
Figure 5:
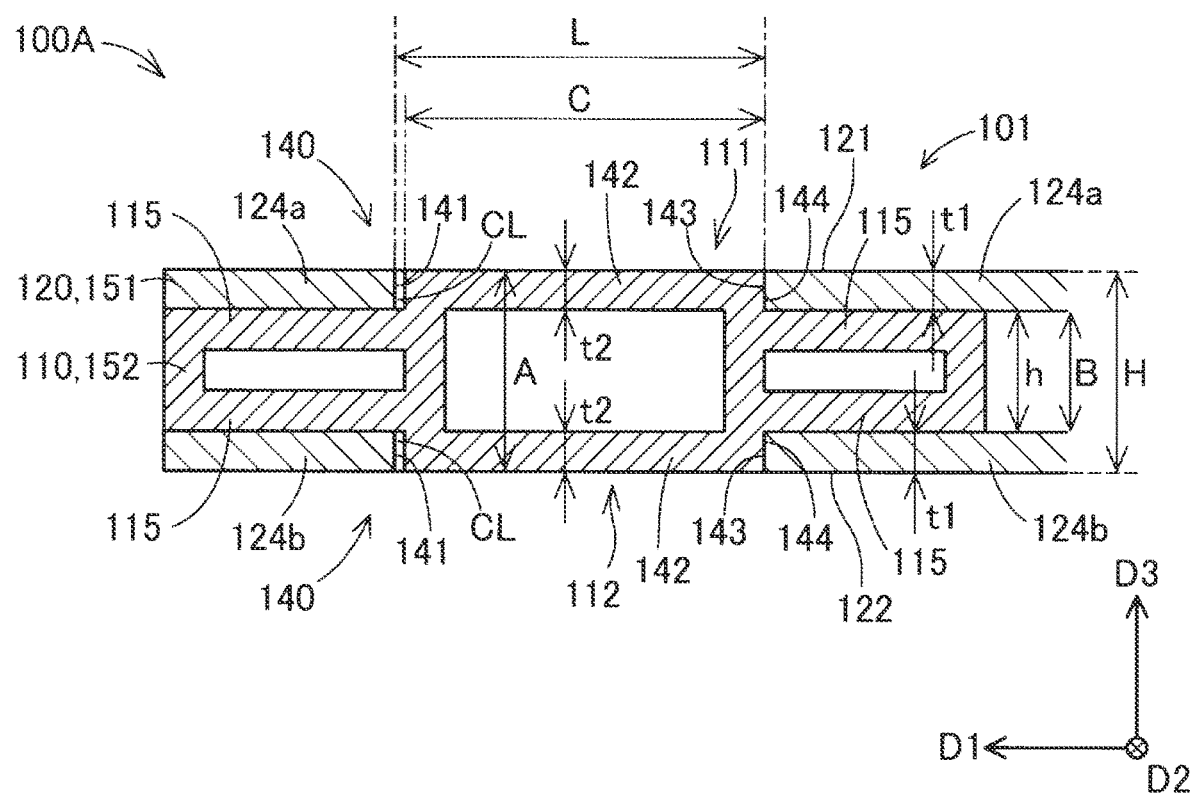
FIG. 5 is a schematic sectional view of a connecting portion of the support frame according to the first embodiment.

With reference to FIGS. 2, 3, 4, and 5, a specific configuration of the support frame 100A of the first embodiment will be described. FIG. 2 is a schematic perspective view illustrating the mounting surface 101 side of the support frame 100A. In FIG. 2, a region where the fuel cell 11 is placed on the support frame 100A is illustrated in an alternate long and short dash line. FIG. 3 is a schematic exploded perspective view of the support frame 100A. FIG. 4 is a schematic plan view of the mounting surface 101 side of the support frame 100A when the mounting surface 101 side is planarly viewed. FIG. 5 is a schematic sectional view of the support frame 100A along a line V-V in FIG. 4.

Now refer to FIGS. 2, 3, and 4. The support frame 100A includes a first member 110, a second member 120, and a third member 130 arranged in the second direction D2. The first member 110 is placed in the center in the second direction D2, and the second member 120 and the third member 130 are arranged on the opposite sides of the first member 110 in the second direction D2. The second member 120 is placed on the right side (a first side) of the first member 110, and the third member 130 is placed on the left side (a second side) of the first member 110.

A position where the first member 110 is connected to the second member 120 and a position where the first member 110 is connected to the third member 130 are defined as connecting portions 140. Three members 110, 120, 130 are joined in a state where they are structurally connected at the connecting portions 140. Hereby, the three members 110, 120, 130 are integrated with each other so as to constitute the support frame 100A. In the vehicle 10, the second member 120 and the third member 130 are fixed to the vehicle frames 20, respectively, so that the first member 110 is supported by the second member 120 and the third member 130.

In the first embodiment, the members 110, 120, 130 are formed by extrusion molding of a metallic material, so that their toughness is increased. Further, in the first embodiment, the members 110, 120, 130 are made of aluminum that is light and easily machined or aluminum alloy containing aluminum by 50% or more by weight of the whole content. In the first embodiment, the members 110, 120, 130 are formed into a hollow box body, so that they are reduced in weight.

Note that, in modifications, the members 110, 120, 130 may be made of a metallic material such as stainless steel other than aluminum and aluminum alloy, for example. Further, the members 110, 120, 130 may not be formed into a hollow box body.

The members 110, 120, 130 have a flat shape having three sides along three directions D1, D2, D3. The longitudinal directions of the second member 120 and the third member 130 correspond to the first direction D1. The dimensions of the second member 120 and the third member 130 in the first direction D1 are larger than the dimension of the first member 110 in the first direction D1. In the first embodiment, the dimensions of the second member 120 and the third member 130 in the first direction D1 are generally the same. Note that respective outer peripheral ends of the second member 120 and the third member 130 may be provided with recessed portions in order to avoid interference with other components in the vehicle 10.

As illustrated in FIGS. 2 and 4, the first member 110 is placed at a front end position of the second member 120 and the third member 130. A position of a front end surface 110f of the first member 110 is aligned with a position of a front end surface 120f of the second member 120 and a front end surface 130f of the third member in the first direction D1. Rear end portions of the second member 120 and the third member 130 extend rearward from the first member 110. Accordingly, in the support frame 100A, a space sandwiched between the second member 120 and the third member 130 is formed in a region behind the first member 110. Due to the space, a material to be used is reduced, so that the support frame 100A is reduced in weight.

Now refer to FIGS. 2 and 3. The first member 110 has a first surface 111 and a second surface 112 facing each other in the third direction D3 and extending along the first direction D1 and the second direction D2. The second member 120 has a first surface 121 and a second surface 122 facing each other in the third direction D3 and extending along the first direction D1 and the second direction D2. The third member 130 has a first surface 131 and a second surface 132 facing each other in the third direction D3 and extending along the first direction D1 and the second direction D2. The first surface 111 of the first member 110, the first surface 121 of the second member 120, and the first surface 131 of the third member 130 face upward in the support frame 100A and constitute a part of the mounting surface 101. The second surface 112 of the first member 110, the second surface 122 of the second member 120, and the second surface 132 of the third member 130 constitute a part of a back surface of the support frame 100A that faces downward. The surfaces 111, 121, 131 constituting the mounting surface 101 have bolt holes to which bolts to fix the fuel cell 11 are to be fastened, but illustration and detailed descriptions thereof are omitted for convenience.

Now refer to FIG. 2. The fuel cell 11 is fixed to a part inside ends, in the first direction D1 and the second direction D2, of the mounting surface 101 of the support frame 100A. That is, the fuel cell 11 is placed behind the front end portions of the members 110, 120, 130 and is also placed in front of the rear end portions of the second member 120 and the third member 130. Further, the fuel cell 11 is placed on the left side from a right end portion of the second member 120 and is also placed on the right side from a left end portion of the third member 130.

As such, the fuel cell 11 is fixed, on the support frame 100A, at a position inwardly from the ends of the support frame 100A in the first direction D1 and the second direction D2. Hereby, at the time of a collision of the vehicle 10, projecting parts of the support frame 100A that project outwardly from the fuel cell 11 can protect the fuel cell 11 from contact with peripheral components, thereby making it possible to restrain the fuel cell 11 from being damaged by the peripheral components.

Now refer to FIG. 2. In the connecting portion 140, the first member 110 is structurally connected to the second member 120, and the first member 110 is structurally connected to the third member 130. In the connecting portions 140, the opposite end parts of the first member 110 in the second direction D2 are inserted into respective end portions of the second member 120 and the third member 130 that face the first member 110 along the second direction D2 in a fitting manner.

In the following description, one of the members connected to each other in the connecting portion 140 is defined as "first connecting member 151," and the other one of the members is defined as "second connecting member 152." That is, the second member 120 and the third member 130 may be each defined as "first connecting member 151," and the first member 110 may be defined as "second connecting member 152." Alternatively, the first member 110 may be defined as "first connecting member 151," and the second member 120 and the third member 130 may be each defined as "second connecting member 152." In the first embodiment, the second member 120 and the third member 130 are the first connecting members 151, and the first member 110 is the second connecting member 152. A fitting portion 142 (described later) is formed in the first member 110. A fitted portion 141 (described later) is formed in each of the second member 120 and the third member 130. The fitted portion 141 and the fitting portion 142 can restrain the first member 110 from deforming such that the first member 110 is displaced from the second member 120 and the third member 130 in a direction along the first direction D1.

Now refer to FIG. 3. A left side end portion 123 of the second member 120 as the first connecting member 151 is provided with a pair of extending portions 124a, 124b formed on the first member 110 side and extending in parallel with each other along the second direction D2. The extending portions 124a, 124b each have a flat shape along the first direction D1 and the second direction D2. A groove 125 along the first direction D1 is formed between the extending portions 124a, 124b.

Similarly to the second member 120, a right side end portion 133 of the third member 130 as the first connecting member 151 is provided with a pair of extending portions 134a, 134b like the extending portions 124a, 124b of the second member 120. Further, a groove 135 along the first direction D1 is formed between the extending portions 134a, 134b.

In the first embodiment, the first extending portions 124a, 134a are placed in upper ends of the side end portions 123, 133, and the second extending portions 124b, 134b are placed in lower ends of the side end portions 123, 133. In the first embodiment, the extending portions 124a, 124b, 134a, 134b are formed along the first direction D1. In modifications, the extending portions 124a, 124b, 134a, 134b may be formed in a part of the side end portions 123, 133.

The extending portions 124a, 124b, 134a, 134b are provided with respective fitted portions 141 formed at respective positions facing rectangular projection portions 113 (described later) of the first member 110 in the second direction D2. The fitted portions 141 in the first embodiment are formed as rectangular recessed portions in a shape formed by cutting corresponding parts of the extending portions 124a, 124b, 134a, 134b along the second direction D2.

The surfaces 111, 112 of the first member 110 as the second connecting member 152 are provided with respective rectangular projection portions 113 having a rectangular shape and formed in the center along the first direction D1 so as to project with a step along the third direction D3. The rectangular projection portions 113 extend along the second direction D2. The rectangular projection portions 113 are formed on the surfaces 111, 112 over the second direction D2. The rectangular projection portions 113 are sandwiched between a pair of side wall portions 115 in the first direction D1. The opposite end parts of the rectangular projection portion 113 in the second direction D2 constitute the fitting portions 142.

Now refer to FIG. 2. The fitting portions 142 are inserted, along the second direction D2, into the fitted portions 141 provided in the first connecting member 151 such that the fitting portions 142 fit in the fitted portions 141. The side wall portions 115 placed on the opposite sides of the fitting portions 142 in the first direction D1 are inserted into the grooves 125, 135 formed in the first connecting members 151 such that the side wall portions 115 fit in the grooves 125, 135. Hereby, the side wall portions 115 face, in the third direction D3, the extending portions 124a, 124b, 134a, 134b constituting peripheral parts of the fitted portions 141.

Now refer to FIG. 3. The fitted portion 141 includes a first locking surface 143 on an inner peripheral surface such that the first locking surface 143 faces forward. The fitting portion 142 includes a stepped surface projecting along the third direction D3. The fitting portion 142 includes a second locking surface 144 on the stepped surface such that the second locking surface 144 faces rearward and faces the first locking surface 143 in the first direction D1. In the support frame 100A, when the first member 110 receives an impact from the front side, the second locking surface 144 of the fitting portion 142 makes surface contact with the first locking surface 143 of the fitted portion 141, so that a further movement of the first member 110 is stopped. This accordingly restrains occurrence of shearing along the front-rear direction, the shearing being caused when the first member 110 is displaced rearward relative to the second member 120 and the third member 130. As such, in the support frame 100A of the first embodiment, the strength to an impact from the front side of the vehicle 10 is increased. This makes it possible to restrain such a situation that, due to an impact from the front side of the vehicle 10, the arrangement of the members 110, 120, 130 constituting the support frame 100A breaks and the members 110, 120, 130 are disassembled.

In the vehicle 10 of the first embodiment, the support frame 100A is provided inside the front room 12 placed at a position close to the front side of the vehicle 10, and the support frame 100A is more likely to receive an impact from the front side in the traveling direction of the vehicle 10. With the vehicle 10 of the first embodiment, due to the aforementioned improvement in strength of the support frame 100A with respect to an impact from the front side, it is possible to achieve a higher effect.

Further, as described above, in the support frame 100A, the first member 110 has a part projecting forward from the fuel cell 11. In the support frame 100A, the rearward movement of the first member 110 is restrained when the support frame 100A receives an impact from the front side of the vehicle 10, thereby restraining the first member 110 from moving to a position inwardly from the fuel cell 11. On this account, even when the vehicle 10 has a collision from the front side, the end of the first member 110 that projects forward from the fuel cell 11 can prevent a peripheral component from being pushed from ahead of the fuel cell 11 toward the fuel cell 11 side and brought into contact with the fuel cell 11. This accordingly restrains the fuel cell 11 from being damaged at the time of a collision of the vehicle 10.

Now refer to FIG. 5. The following description about the connecting portion 140 between the first member 110 and the second member 120 also applies to the connecting portion 140 between the first member 110 and the third member 130. Note that "equal (the same)" used in the following description shall allow an error range of around 3% to 5%, for example.

In the first embodiment, a thickness H in a part where the fitted portions 141 of the second member 120 are formed is equal to a thickness A in a part where the fitting portions 142 of the first member 110 are formed. That is, H=A is established. Further, in the first embodiment, the extending portions 124a, 124b have the same plate thickness t1, and the plate thickness t1 corresponds to a depth of the fitted portion 141 in the third direction D3. Further, constituent parts of the fitting portions 142 on the first surface 111 side and the second surface 112 side have the same plate thickness t2, and the plate thickness t2 corresponds to a height of the stepped surface of the fitting portion 142 relative to the side wall portions 115 in the third direction D3. In the support frame 100A of the first embodiment, two plate thicknesses t1, t2 are equal to each other. That is, t1=t2 is established.

Hereby, a surface of a peripheral part of the fitted portion 141 and a top face of the fitting portion 142 in its projection direction are aligned at the same position in the third direction D3, thereby restraining formation of a step projecting along the third direction D3 in a boundary between the fitted portion 141 and the fitting portion 142. This accordingly restrains the support frame 100A from being damaged due to a peripheral component and the like being caught in such a step at the time of a collision of the vehicle 10 or the like.

In the support frame 100A of the first embodiment, a thickness B of the side wall portion 115 in the third direction D3 is not more than a width h of the groove 125 in the third direction D3. Further, in the support frame 100A of the first embodiment, the width h of the groove 125 in the third direction D3 is not more than a value obtained by subtracting the plate thicknesses t1 of the extending portions 124a, 124b from the thickness H in the part where the fitted portions 141 of the second member 120 are formed. That is, in the support frame 100A, a relationship of H−2×t1≥h≥B is satisfied. Hereby, an end of the first member 110 in the second direction D2 can easily fit in the groove 125 of the second member 120, so that the support frame 100A can be easily assembled.

Here, in order to facilitate insertion of the fitting portion 142 into the fitted portion 141 in the second direction D2, it is preferable that a width C of the fitting portion 142 in the first direction D1 be not more than a width L of the fitted portion 141 in the first direction D1. That is, it is preferable that L C be established. In the support frame 100A of the first embodiment, the width C of the fitting portion 142 in the first direction D1 is smaller than the width L of the fitted portion 141 in the first direction D1. That is, L>C is established.

Further, in the support frame 100A of the first embodiment, in a state where the first locking surface 143 and the second locking surface 144 make contact with each other on the rear side of the fitting portion 142, the first member 110 and the second member 120 are fixed by joining. In the first embodiment, the first member 110 and the second member 120 are joined to each other by welding. Accordingly, a gap CL is formed between the front side of the fitting portion 142 and an inner wall surface of the fitted portion 141. A width of the gap CL in the first direction D1 may be around 1 mm to 3 mm, for example, in consideration of a manufacturing error.

In the support frame 100A of the first embodiment, even when the support frame 100A receives an impact from the front side, the first locking surface 143 and the second locking surface 144 make contact with each other, thereby restraining the first member 110 from moving rearward along the first direction D1 relative to the second member 120. This accordingly restrains occurrence of a shear force between the first member 110 and the second member 120, thereby restraining a joining portion between the first member 110 and the second member 120 from being broken by such a shear force. This restrains the support frame 100A from being disassembled.

As described above, the support frame 100A of the first embodiment is manufactured such that the members 110, 120, 130 are individually manufactured and then assembled. On that account, in accordance with the size of the fuel cell 11 to be supported, the support frame 100A can be easily upsized. Further, in the support frame 100A of the first embodiment, the strength to an impact from the front side is increased by joining of the second member 120 and the third member 130 to the first member 110 and the engagement between two locking surfaces 143, 144. This restrains breakages such as disassembly and deformation of the support frame 100A due to the impact from the front side at the time of a collision of the vehicle 10. Accordingly, at the time of a collision of the vehicle 10, it is possible to restrain the fuel cell 11 from coming off from the support frame 100A or to restrain a decrease in protection performance of the support frame 100A to protect the fuel cell 11 from a peripheral component. Accordingly, with the support frame 100A, it is possible to facilitate securing of safety determined by law with respect to a vehicle equipped with a fuel cell. In addition, in the support frame 100A of the first embodiment, the fitted portions 141 and the fitting portions 142 constituting a fitting structure for raising the strength in the first direction D1 are formed by easy machining of a plate-shaped member manufactured by extrusion molding of a metallic material. Hereby, members at the time of forming such a fitting structure can be easily handled, for example, and thus, the support frame 100A can be easily manufactured. This makes it possible to reduce a manufacturing cost. In addition, with the support frame 100A of the first embodiment and the vehicle 10 including the support frame 100A, it is possible to yield various effects described in the first embodiment.

2. Second Embodiment

Figure 6:
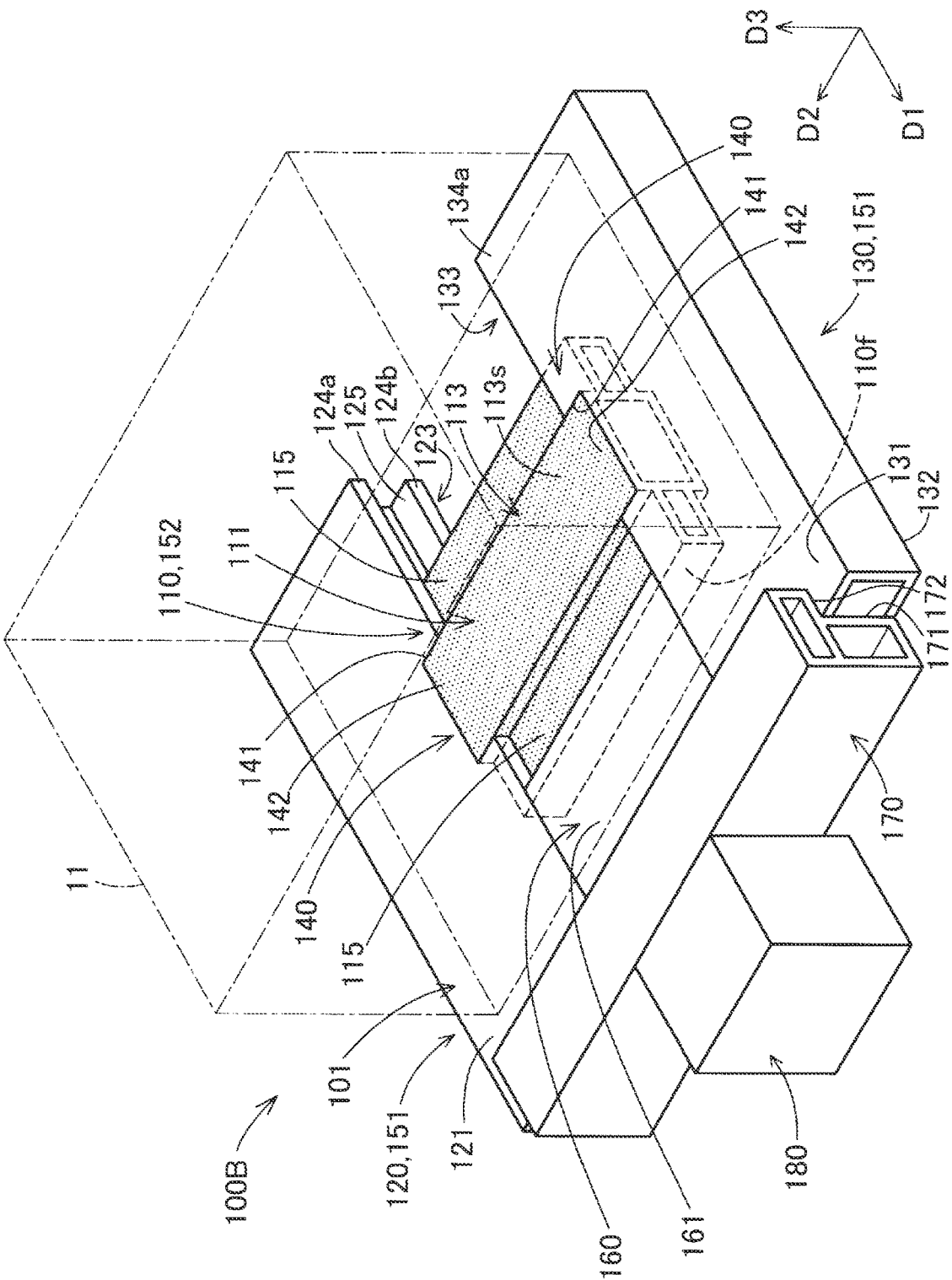
FIG. 6 is a schematic perspective view of a support frame according to a second embodiment.
Figure 7:
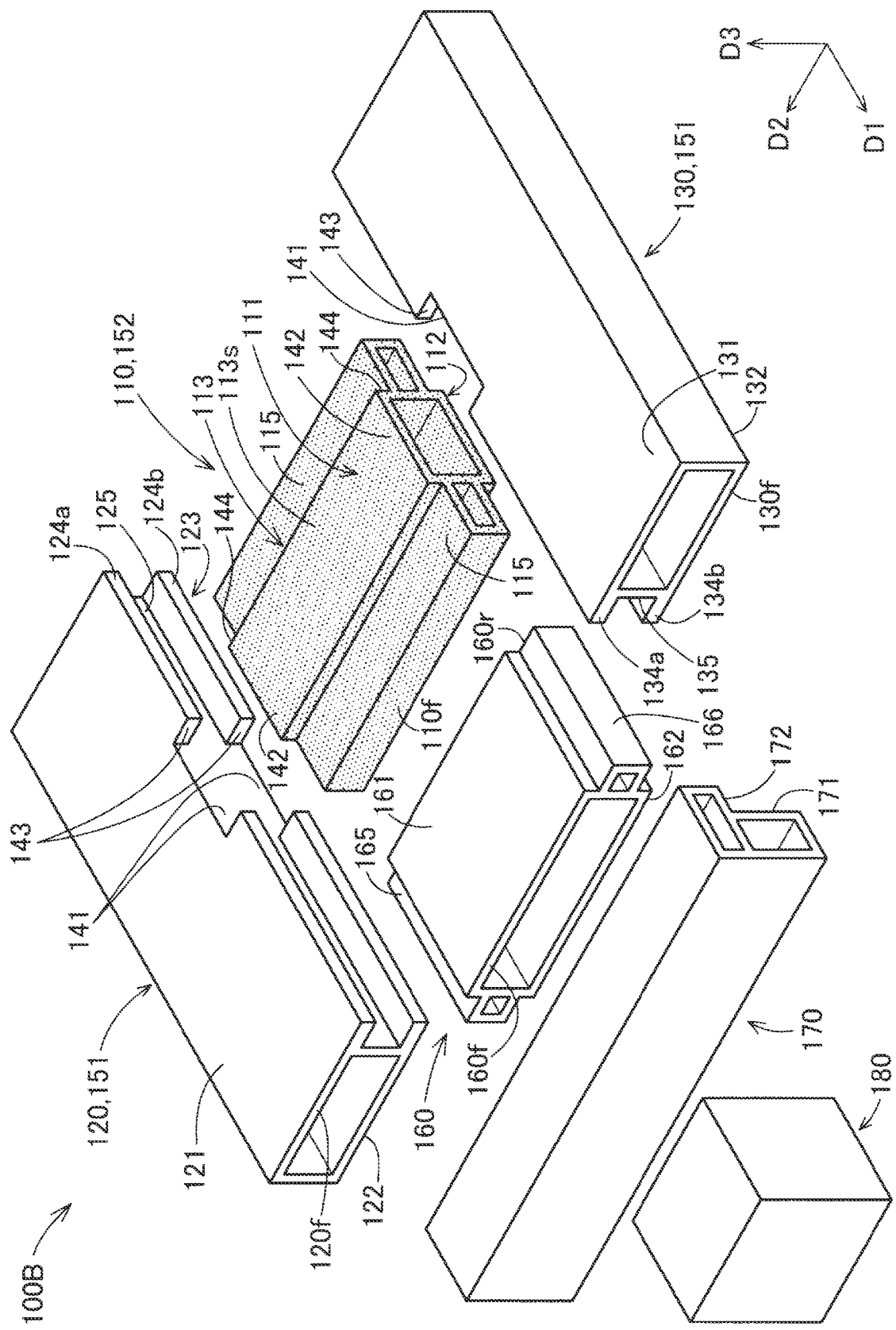
FIG. 7 is a schematic exploded perspective view of the support frame according to the second embodiment.
Figure 8:
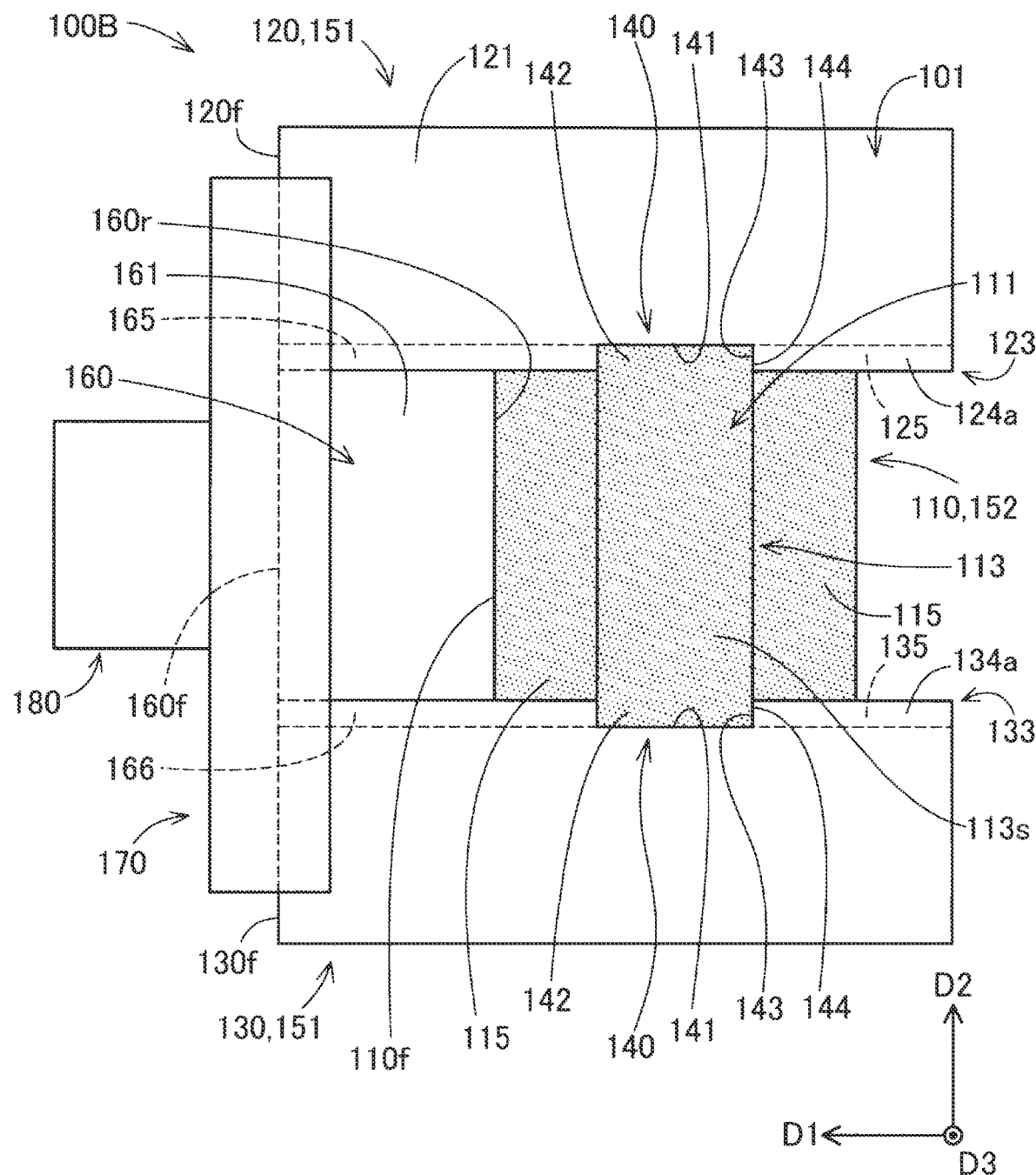
FIG. 8 is a schematic plan view of the support frame according to the second embodiment.

With reference to FIGS. 6, 7, and 8, a configuration of a support frame 100B of a second embodiment will be described. FIG. 6 is a schematic perspective view of the support frame 100B according to the second embodiment. FIG. 7 is a schematic exploded perspective view of the support frame 100B of the second embodiment. FIG. 8 is a schematic plan view of the mounting surface 101 of the support frame 100B of the second embodiment when the mounting surface 101 is planarly viewed.

The support frame 100B of the second embodiment is provided in the same vehicle 10 as what is described in the first embodiment and supports the fuel cell 11. A configuration of the support frame 100B of the second embodiment is generally the same as the configuration of the support frame 100A of the first embodiment except the following points. In the support frame 100B of the second embodiment, the first member 110 is fixed to the second member 120 and the third member 130 at a different position from that in the first embodiment. Further, in the support frame 100B of the second embodiment, three members 160, 170, 180 are added.

Now refer to FIG. 6. In the support frame 100B of the second embodiment, the first member 110 is fixed at a position behind the front end portions of the second member 120 and the third member 130. In the support frame 100B, the first member 110 is joined to the second member 120 and the third member 130 such that the first member 110 is structurally connected to the second member 120 and the third member 130 at the connecting portions 140, similarly to the first embodiment described above.

In the support frame 100B, the three members 160, 170, 180 are added in front of the first member 110. The members 160, 170, 180 are made of a metallic material such as aluminum or aluminum alloy. In the second embodiment, the members 160, 170, 180 are made by extrusion.

Now refer to FIGS. 6 and 8. The fourth member 160 is provided between the second member 120 and the third member 130 in front of the first member 110. Now refer to FIG. 7. The fourth member 160 is a flat-shaped member having a first surface 161 and a second surface 162 extending along the first direction D1 and the second direction D2. The first surface 161 of the fourth member 160 constitutes a part of the mounting surface 101 of the support frame 100B. The second surface 162 is placed on the opposite side from the first surface 161 and constitutes a part of a back surface of the support frame 100B, the back surface facing downward. In the second embodiment, the fourth member 160 is formed into a hollow box body, so that the fourth member 160 is reduced in weight.

Now refer to FIG. 7. The fourth member 160 includes a rectangular support portion 165 projecting toward the second member 120 and a rectangular support portion 166 projecting toward the third member 130 such that the support portion 165 and the support portion 166 are provided on the opposite side faces of the fourth member 160 in the second direction D2. The right support portion 165 is inserted into the groove 125 of the second member 120 along the second direction D2 such that the right support portion 165 fits in the groove 125. The left support portion 166 is inserted into the groove 135 of the third member 130 along the second direction D2 such that the left support portion 166 fits in the groove 135. By the fitting of the support portions 165, 166 in the grooves 125, 135, the fourth member 160 is supported by the second member 120 and the third member 130 as illustrated in FIG. 6.

Now refer to FIG. 8. A position of a front end surface 160f of the fourth member 160 is aligned with a position of the front end surface 120f of the second member 120 and a position of the front end surface 130f of the third member 130 in the first direction D1. Further, a rear end surface 160r of the fourth member 160 makes surface contact with the front end surface 110f of the first member 110. That is, the fourth member 160 is supported by the first member 110 in the first direction D1. As well as the first member 110, the fourth member 160 has a function to increase the strength of the support frame 100B with respect to an impact from the front side.

Now refer to FIG. 6. In the second embodiment, the first surface 161 of the fourth member 160, a top face 113s of the rectangular projection portion 113 of the first member 110, the first surface 121 of the second member 120, and the first surface 131 of the third member 130 are aligned at the same position in the third direction D3. A front end portion of the fuel cell 11 is placed on the first surface 161 of the fourth member 160. The first surface 161 of the fourth member 160 may have a bolt hole to which a bolt to fix the fuel cell 11 is fastened.

Now refer to FIGS. 6 and 7. The fifth member 170 is provided in front of the second member 120, the third member 130, and the fourth member 160. The fifth member 170 is a rectangular columnar member the longitudinal direction of which is along the second direction D2 and is provided to extend from the front end portion of the second member 120 to the front end portion of the third member 130. The fifth member 170 is provided in front of a region where the fuel cell 11 is fixed.

An outer peripheral contour of a section of the fifth member 170 in a direction perpendicular to its longitudinal direction has a generally L-shape. The fifth member 170 has a first joining surface 171 facing rearward and a second joining surface 172 facing downward and extending rearward from an upper end of the first joining surface 171. The first joining surface 171 is joined to the front end surfaces 120f, 130f, 160f of the second member 120, the third member 130, and the fourth member 160. The second joining surface 172 is placed on the front end portions of the second member 120, the third member 130, and the fourth member 160 and joined to those front end portions.

Since the fifth member 170 is provided to extend along the second direction D2, it is possible to restrain the support frame 100B from deforming due to displacement of the second member 120 and the third member 130 by an impact from a direction along the second direction D2. Further, the strength of the support frame 100B with respect to an impact in the direction along the second direction D2 is increased by the fifth member 170 provided along the second direction D2. In the second embodiment, the fifth member 170 is formed into a hollow box body. Hereby, the fifth member 170 is reduced in weight. Further, the fifth member 170 functions as a crushable zone that absorbs an impact by crushing when the support frame 100B receives the impact from the front side.

Now refer to FIGS. 6 and 7. The sixth member 180 is joined to the front side of the fifth member 170. The sixth member 180 is formed into a hollow box body. The dimension of the sixth member 180 in the second direction D2 is smaller than the dimension of the fifth member 170 in the second direction D2. The sixth member 180 is provided in the center of the fifth member 170 in the second direction D2 so as to project forward. The sixth member 180 functions as a crushable zone that absorbs an impact by crushing when the support frame 100B receives the impact from the front side.

As described above, in the support frame 100B of the second embodiment, its strength and durability to an impact are increased by the three members 160, 170, 180 provided in front of the first member 110. In addition, with the support frame 100B of the second embodiment and the vehicle 10 including the support frame 100B, it is possible to yield various effects similar to those described in the first embodiment.

3. Third Embodiment

Figure 9:
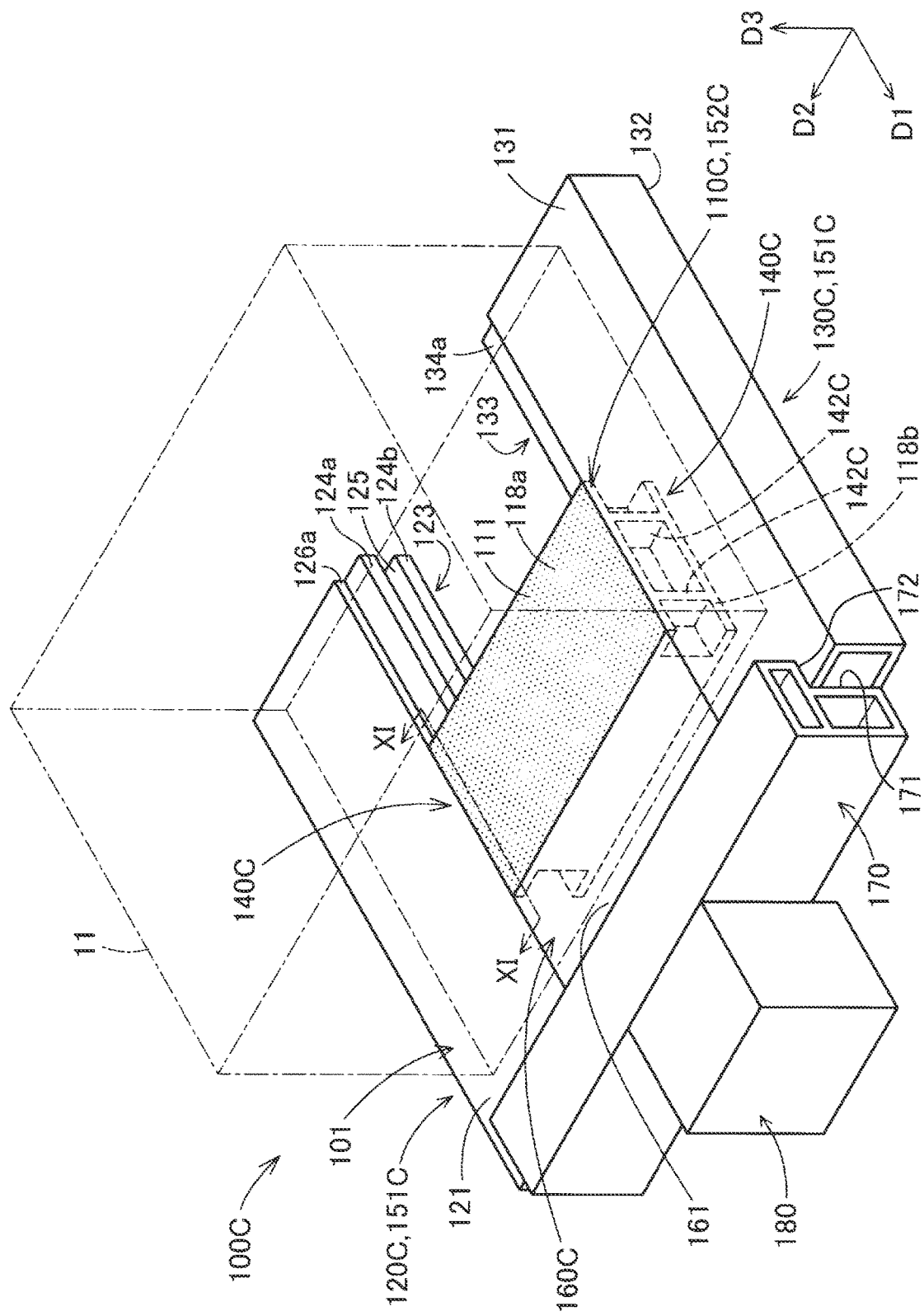
FIG. 9 is a schematic perspective view of a support frame according to a third embodiment.
Figure 10:
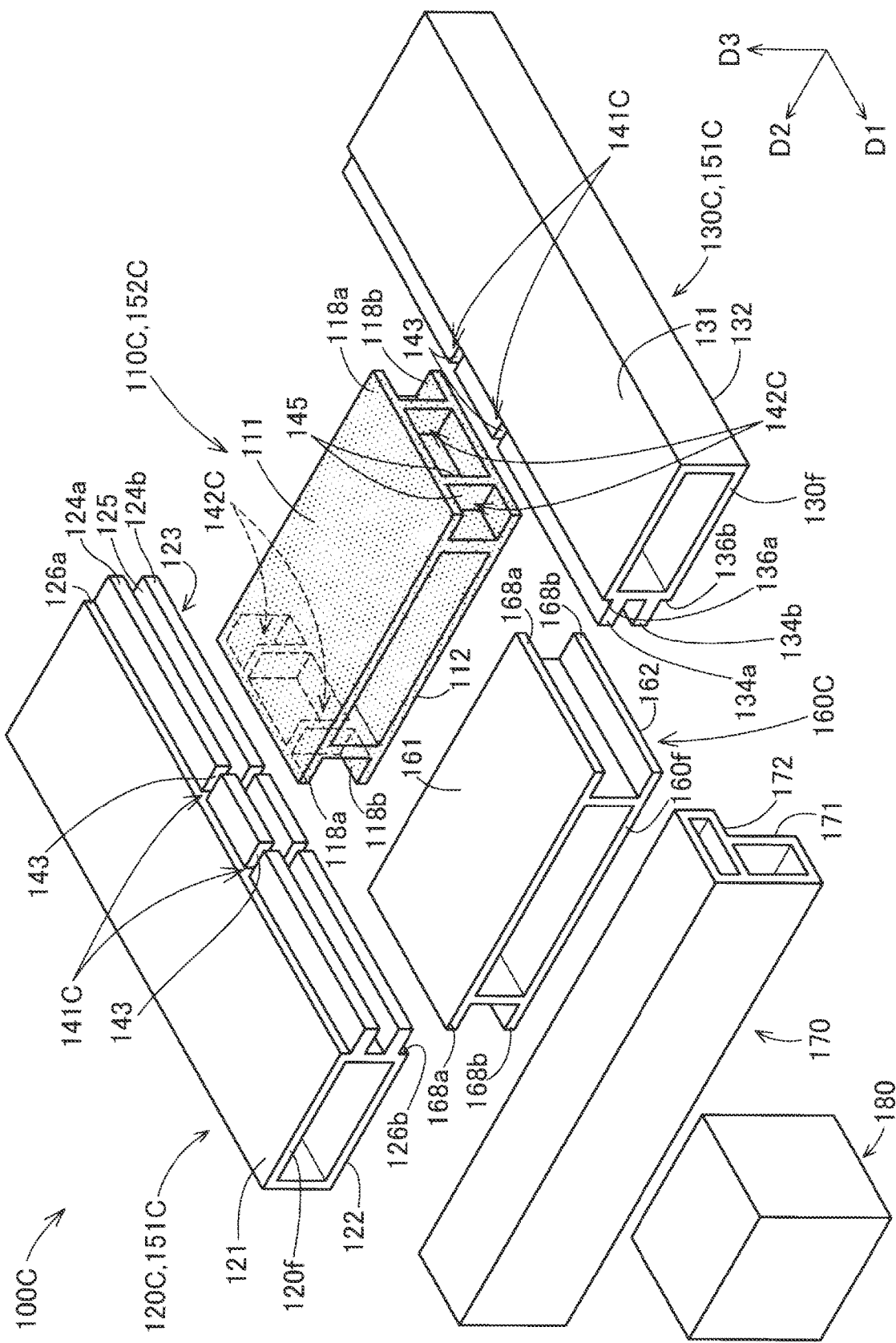
FIG. 10 is a schematic exploded perspective view of the support frame according to the third embodiment.
Figure 11:
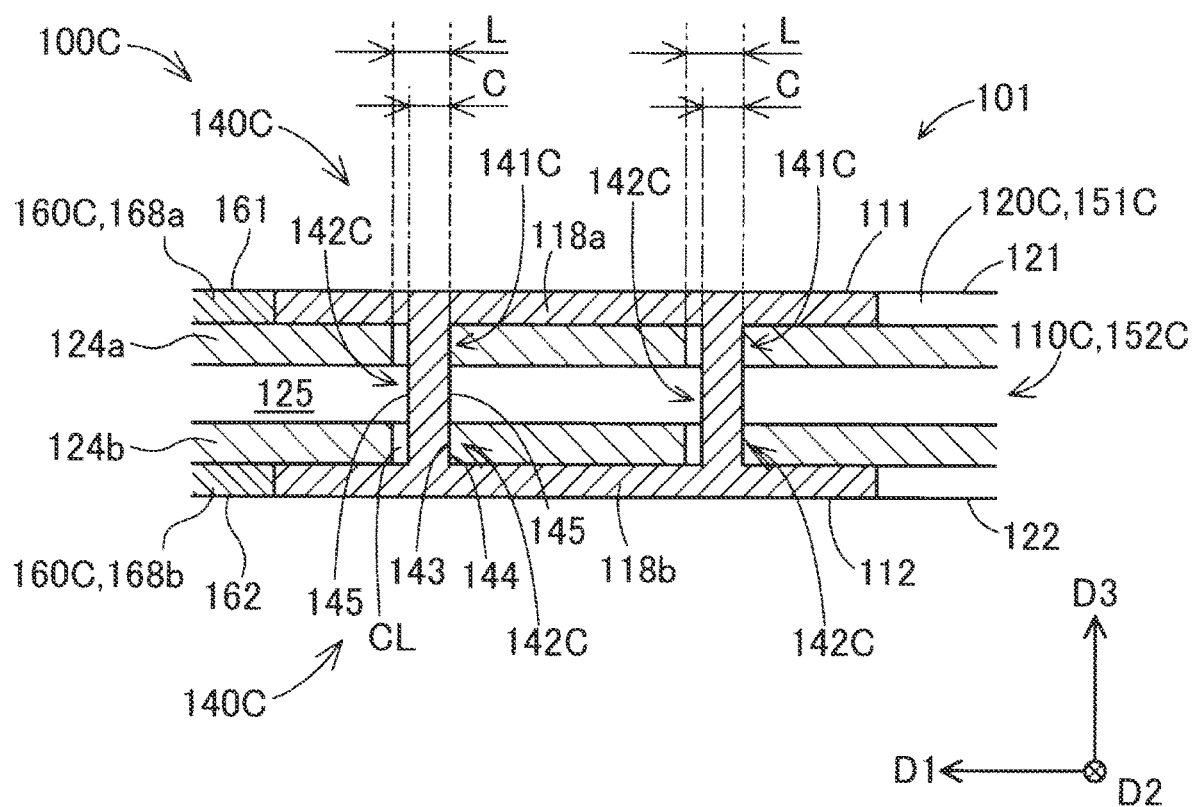
FIG. 11 is a schematic sectional view of a connecting portion of the support frame according to the third embodiment.

With reference to FIGS. 9, 10, and 11, a configuration of a support frame 100C of a third embodiment will be described. FIG. 9 is a schematic perspective view illustrating the mounting surface 101 side of the support frame 100C of the third embodiment. FIG. 10 is a schematic exploded perspective view of the support frame 100C of the third embodiment. FIG. 11 is a schematic sectional view of the support frame 100C of the third embodiment, taken along a line XI-XI in FIG. 9.

Now refer to FIGS. 9 and 10. The support frame 100C of the third embodiment is provided in the same vehicle 10 as what is described in the first embodiment and supports the fuel cell 11. A configuration of the support frame 100C of the third embodiment is generally the same as the configuration of the support frame 100B of the second embodiment except the following points. The support frame 100C of the third embodiment includes four members 110C, 120C, 130C, 160C instead of the four members 110, 120, 130, 160 described in the above embodiment.

Configurations of the first member 110C, the second member 120C, and the third member 130C of the third embodiment in connecting portions 140C are different from the configurations of the connecting portions 140 as described in the first embodiment. In the following description, one of the members connected to each other in the connecting portion 140C is defined as "first connecting member 151C," and the other one of the members is defined as "second connecting member 152C." In the third embodiment, the second member 120C and the third member 130C are the first connecting members 151C, and the first member 110C is the second connecting member 152C.

Now refer to FIG. 10. In the second member 120C and the third member 130C as the first connecting members 151C of the third embodiment, the extending portions 124a, 124b, 134a, 134b are formed at positions different from those provided in the second member 120 and the third member 130 in the first embodiment. In the second member 120C, the first extending portion 124a is provided at a position deviating downward from the first surface 121 so that a stepped portion 126a along the third direction D3 is formed above a base end (a root part) of the first extending portion 124a, and the first extending portion 124a extends from the side end portion 123 toward the first member 110C side along the second direction D2. The second extending portion 124b is provided at a position deviating upward from the second surface 122 so that a stepped portion 126b along the third direction D3 is formed below a base end of the second extending portion 124b, and the second extending portion 124b extends from the side end portion 123 toward the first member 110C side along the second direction D2. Similarly, in the third member 130C, the first extending portion 134a is formed at a position deviating downward from the first surface 131 so that a stepped portion 136a is formed above a base end of the first extending portion 134a. Further, the second extending portion 134b is formed at a position deviating upward from the second surface 132 so that a stepped portion 136b is formed below a base end of the second extending portion 134b.

A fitted portion 141C in the third embodiment in the connecting portion 140C of the third embodiment is constituted by a plurality of recessed portions in a slit shape along the second direction D2 in each of the extending portions 124a, 124b, 134a, 134b. A width of the fitted portion 141C in the first direction D1 is smaller than a depth with which the fitted portion 141C is cut along the second direction. A plurality of fitted portions 141C is arranged in the first direction D1. Note that the reference figure illustrates an example in which two fitted portions 141C are formed. A surface facing forward in an inner peripheral surface of the fitted portion 141C constitutes the first locking surface 143.

The first member 110C as the second connecting member 152C in the third embodiment is not provided with the rectangular projection portions 113 described in the first embodiment. The first surface 111 and the second surface 112 of the first member 110C are constituted by a flat surface. The first member 110C includes a pair of cover wall portions 118a, 118b on each of the opposite sides of the first member 110C in the second direction D2. The cover wall portions 118a, 118b extend toward the second member 120 or the third member 130 as the first connecting member 151C along the second direction D2. The cover wall portions 118a, 118b are flat-shaped parts extending along the first direction D1 and the second direction D2 and placed in an upper end and a lower end of each side end surface of the first member 110.

A plurality of fitting wall portions 142C constituting a fitting portion in the connecting portion 140C of the third embodiment is provided between the cover wall portions 118a, 118b. The fitting wall portion 142C intersects with the cover wall portions 118a, 118b and has two wall surfaces 145 extending along the second direction D2 and the third direction D3.

In the support frame 100C, the extending portions 124a, 124b and the extending portions 134a, 134b of respective first connecting members 151C are inserted, along the second direction D2, between the cover wall portions 118a, 118b provided on the opposite sides of the second connecting member 152C in the second direction D2. The fitting wall portions 142C are inserted into the fitted portions 141C along the second direction D2 such that the fitting wall portions 142C fit in the fitted portions 141C.

The first cover wall portions 118a are provided above the first extending portions 124a, 134a so as to cover the first extending portions 124a, 134a and the fitted portions 141C of the first connecting members 151C. Further, the second cover wall portions 118b are provided below the second extending portions 124b, 134b so as to cover the second extending portions 124b, 134b and the fitted portions 141C of the first connecting members 151C. This accordingly restrains the first member 110C from falling off from the second member 120C and the third member 130C in a direction along the third direction D3.

Now refer to FIGS. 9 and 10. The fourth member 160C of the third embodiment is provided with a pair of support wall portions 168a, 168b on each of the opposite side faces of the fourth member 160C in the second direction D2. Similarly to the cover wall portions 118a, 118b of the first member 110C, the support wall portions 168a, 168b extend in the second direction D2 and overlap with the extending portions 124a, 124b, 134a, 134b in the third direction D3. Accordingly, the fourth member 160C is supported between the second member 120C and the third member 130C, so that it is possible to restrain the fourth member 160C from falling off from the second member 120C and the third member 130C in a direction along the third direction D3.

Now refer to FIG. 11. The following description about the set of the first member 110C and the second member 120C also applies to the set of the first member 110C and the third member 130C. As described above, each of the fitting wall portions 142C fits into a corresponding one of the fitted portions 141C. A part of the wall surface 145 facing rearward, out of two wall surfaces 145 included in each of the fitting wall portions 142C, constitutes the second locking surface 144.

In the support frame 100C, when the support frame 100C receives an impact from the front side, the first locking surface 143 is received by the second locking surface 144, so that it is possible to restrain the first member 110C from being displaced rearward relative to the second member 120C. This accordingly restrains the support frame 100C from deforming or being disassembled due to displacement of the first member 110C and the second member 120C by the impact from the front side of the vehicle 10.

Here, a width C of the fitting wall portion 142C as the fitting portion in the first direction D1 is smaller than a width L of the fitted portion 141C in the first direction D1. That is, L>C is established. This facilitates insertion of the fitting wall portion 142C into the fitted portion 141C. Further, in the support frame 100C of the third embodiment, the first member 110C is joined to the second member 120C and the third member 130C in a state where the first locking surface 143 and the second locking surface 144 make contact with each other on the rear side of the fitting wall portion 142C. Accordingly, it is possible to restrain such a situation that, when the support frame 100C receives an impact from the front side, the first member 110C is displaced rearward relative to the second member 120C and joining portions of the first member 110C with the second and third members 120C, 130C are broken.

In the support frame 100C, the stepped portions 126a, 126b of the second member 120C face distal surfaces of the cover wall portions 118a, 118b in the second direction D2, respectively. Further, the heights of the stepped portions 126a, 126b of the second member 120C in the third direction D3 are equal to the thicknesses of the cover wall portions 118a, 118b in the third direction D3. This also applies to the stepped portions 136a, 136b of the third member 130C. Accordingly, in the support frame 100C, it is possible to restrain steps projecting in the third direction D3 from being formed in a boundary between the first surface 111 of the first member 110C and the first surface 121 of the second member 120C and a boundary between the first surface 111 of the first member 110C and the first surface 131 of the third member 130C. Also, it is possible to restrain such steps from being formed in a boundary between the second surface 112 of the first member 110C and the second surface 122 of the second member 120C and a boundary between the second surface 112 of the first member 110C and the second surface 132 of the third member 130C. Accordingly, in the support frame 100C, it is possible to restrain a breakage caused due to a peripheral component and the like being caught in such a step between the first member 110C and the second member 120C or the third member 130C at the time of a collision of the vehicle 10 or the like.

Now refer to FIGS. 9 and 11. The first surface 161 and the second surface 162 of the fourth member 160C are adjacent to the first surfaces 111, 121, 131 and the second surfaces 112, 122, 132 of the three members 110C, 120C, 130C, and their positions in the third direction D3 are aligned with each other. This accordingly restrains a step from being formed in a boundary between the fourth member 160C and each of the members 110C, 120C, 130C adjacent to the fourth member 160C. This accordingly restrains a breakage caused due to a peripheral component and the like being caught in such a step at the time of a collision of the vehicle 10 or the like.

As described above, with the support frame 100C of the third embodiment, the strength to an impact from the front side is increased by the configuration of the connecting portion 140C, similarly to the support frame 100A of the first embodiment. Further, with the support frame 100C of the third embodiment, the fitted portions 141C and the fitting wall portions 142C constituting a fitting structure for increasing the strength in the first direction D1 are formed by easy machining of a plate-shaped member manufactured by extrusion molding of a metallic material. This makes it possible to simplify the manufacturing process of the support frame 100C. In addition, with the support frame 100C of the third embodiment and the vehicle 10 including the support frame 100C, it is possible to yield various effects similar to those described in the above embodiments.

4. Fourth Embodiment

Figure 12:
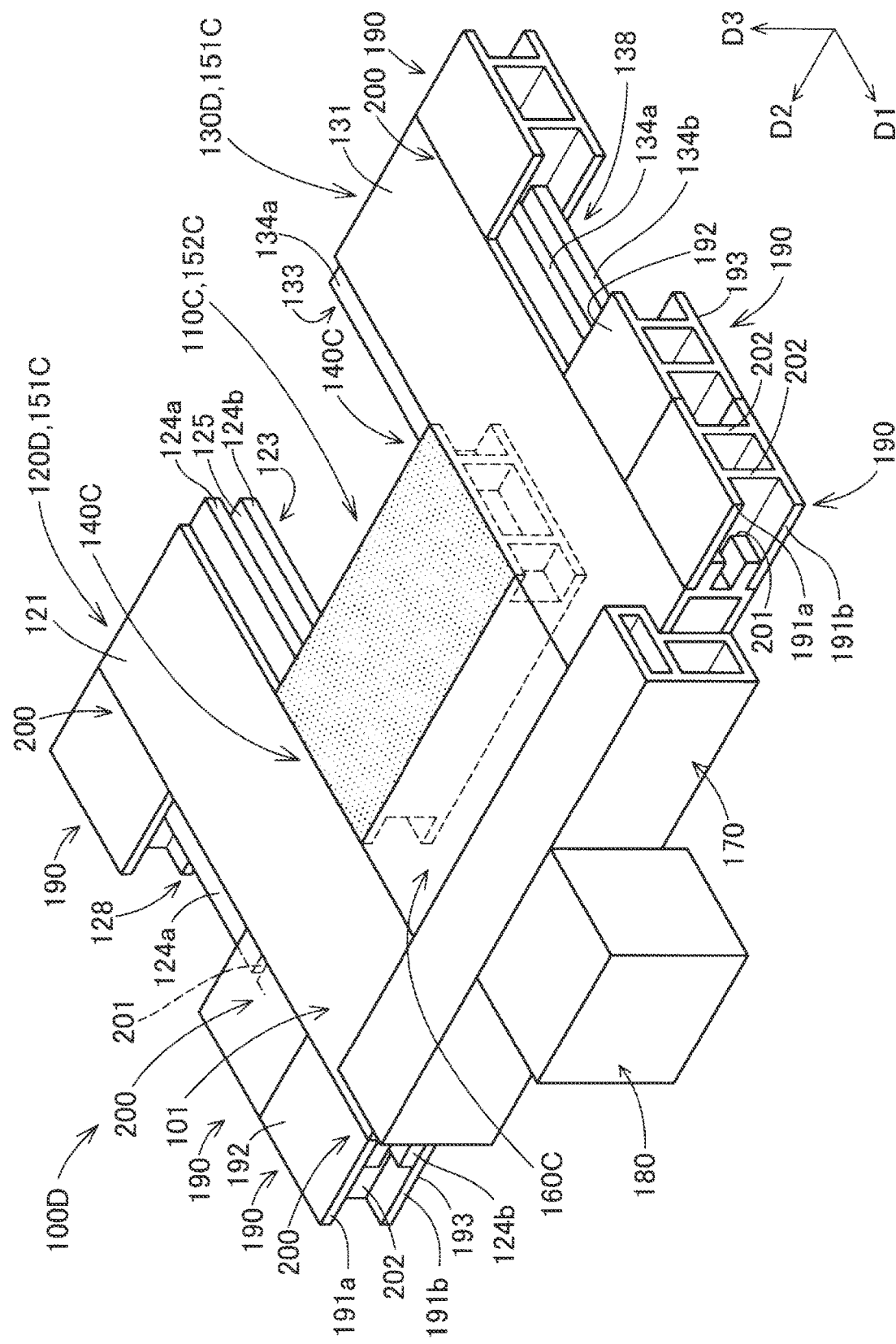
FIG. 12 is a schematic perspective view of a support frame according to a fourth embodiment.
Figure 13:
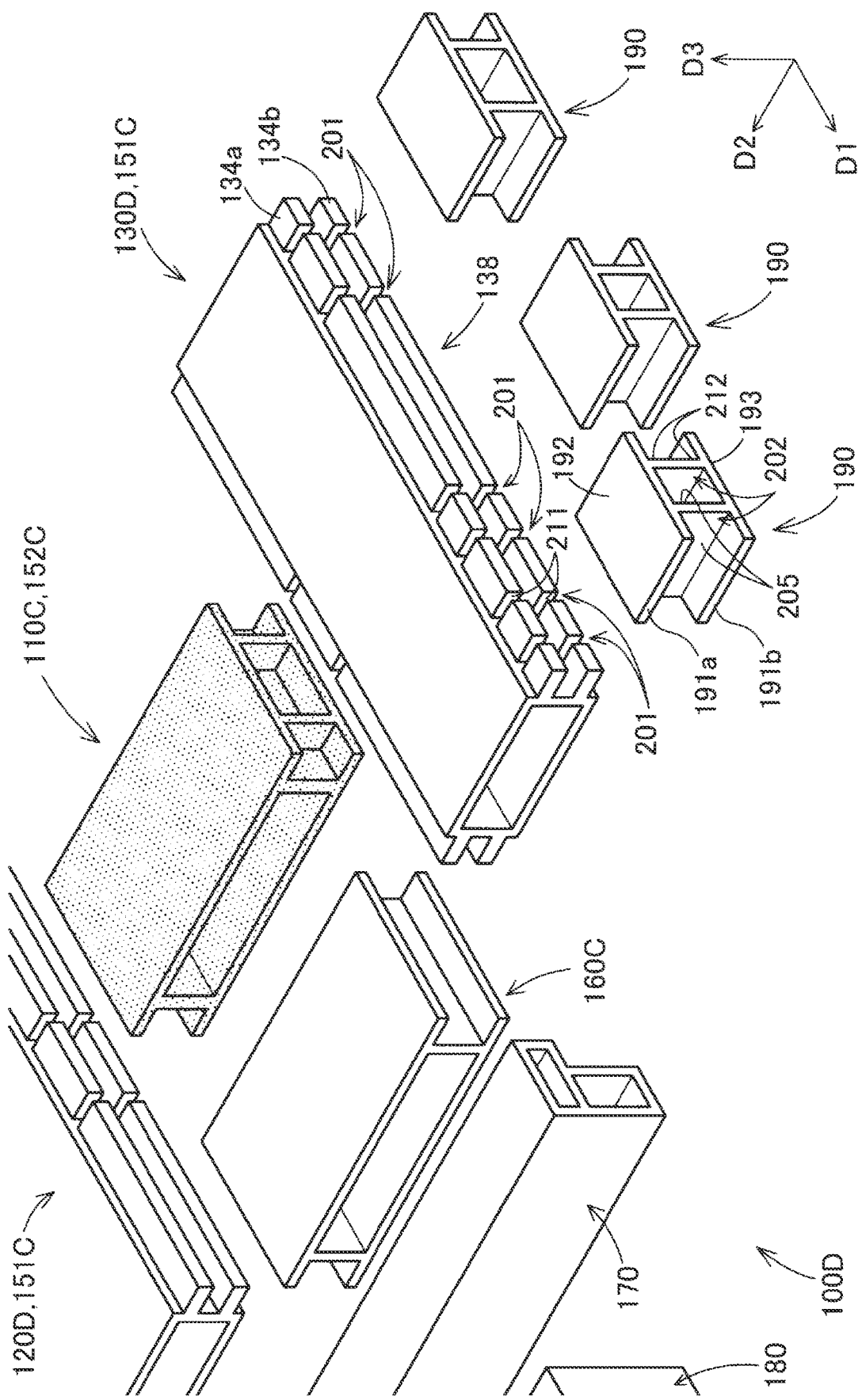
FIG. 13 is a schematic exploded perspective view of the support frame according to the fourth embodiment.

With reference to FIGS. 12 and 13, a configuration of a support frame 100D of a fourth embodiment will be described. FIG. 12 is a schematic perspective view illustrating the mounting surface 101 side of the support frame 100D of the fourth embodiment. FIG. 13 is a schematic exploded perspective view of the support frame 100D of the fourth embodiment. FIG. 13 illustrates only a part of the support frame 100D of the fourth embodiment for convenience.

The support frame 100D of the fourth embodiment is provided in the same vehicle 10 as what is described in the first embodiment and supports the fuel cell 11. A configuration of the support frame 100D of the fourth embodiment is generally the same as the configuration of the support frame 100C of the third embodiment except the following points. The support frame 100D of the fourth embodiment includes a second member 120D and a third member 130D of the fourth embodiment instead of the second member 120C and the third member 130C of the third embodiment. Further, a plurality of additional members 190 is connected to the opposite sides of the support frame 100D in the second direction D2 in the fourth embodiment. The additional member 190 is joined to the second member 120D or the third member 130D in a state where the additional member 190 is structurally connected to the second member 120D or the third member 130D by an additional connecting portion 200 similar to the connecting portion 140C described in the third embodiment.

Now refer to FIG. 12. In the fourth embodiment, a pair of extending portions 124a, 124b is added to each of the opposite sides of the second member 120D in the second direction D2, and a pair of extending portions 134a, 134b is added to each of the opposite sides of the third member 130D in the second direction D2. The extending portions 124a, 124b provided on a right side end portion 128 of the second member 120D extend toward the right side along the second direction D2. The extending portions 134a, 134b provided on a left side end portion 138 of the third member 130D extend toward the left side along the second direction D2.

Now refer to FIGS. 12 and 13. Each of the extending portions 124a, 124b, 134a, 134b is provided with a plurality of additional fitted portions 201 to which the additional member 190 is connected. The additional fitted portion 201 is constituted by a slit-shaped recessed portion along the second direction D2, similarly to the fitted portion 141C. An inner wall surface of the additional fitted portion 201 includes a first additional locking surface 211 facing forward.

In the second member 120D and the third member 130D, the additional members 190 are connected by being arranged in the first direction D1. Some of the additional members 190 have a different dimension in the first direction D1. Since the additional members 190 are connected, the support frame 100D is increased in dimension in the second direction D2. The additional members 190 are made of a metallic material such as aluminum or aluminum alloy, for example. The additional members 190 are made by extrusion, for example. Note that the number of additional members 190 arranged in the first direction D1 and the dimensions of the additional members 190 in the first direction D1 are changeable appropriately in accordance with a setup condition of the support frame 100D. For example, in modifications, one additional member 190 may be connected to each of the second member 120D and the third member 130D such that the additional member 190 is set to have the same dimension as that of the second member 120D and the third member 130D in the first direction D1.

Now refer to FIGS. 12 and 13. The additional member 190 includes a pair of flat-shaped additional wall portions 191a, 191b arranged on the upper side and the lower side of the additional member 190. The first additional wall portion 191a placed on the upper side has a generally square upper wall surface 192 extending along the first direction D1 and the second direction D2 and facing upward. The second additional wall portion 191b placed on the lower side has a generally square lower wall surface 193 extending along the first direction D1 and the second direction D2 and facing downward. Each of the additional wall portions 191a, 191b overlaps with a corresponding one of the extending portions 124a, 124b, 134a, 134b in the third direction D3 so as to cover a corresponding one of the extending portions 124a, 124b, 134a, 134b and the additional fitted portions 201.

Now refer to FIG. 12. The upper wall surface 192 of the first additional wall portion 191a is adjacent to a corresponding one of the first surfaces 121, 131 of the second member 120D and the third member 130D and is aligned with the corresponding one of the first surfaces 121, 131 in the third direction D3. This restrains a step from being formed on the mounting surface 101 and restrains an occurrence of a breakage caused due to the step. The upper wall surface 192 of the first additional wall portion 191a constitutes a part of the mounting surface 101 of the support frame 100D. The first additional wall portion 191a may have a bolt hole to which a bolt to fix the fuel cell 11 is fastened. Meanwhile, the second additional wall portion 191b may have a through-hole or the like for the fixing portion 21 that fixes the support frame 100D to the vehicle frame 20. In the additional connecting portion 200 of the fourth embodiment, a region where the bolt hole and the through-hole for the fixing portion 21 are formed is increased by the additional wall portions 191a, 191b, thereby increasing a degree of freedom in mounting layout of the fuel cell 11 in the vehicle 10.

Now refer to FIGS. 12 and 13. Additional fitting wall portions 202 are provided between the additional wall portions 191a, 191b. The additional fitting wall portion 202 includes two wall surfaces 205 extending along the second direction D2 and the third direction D3 and facing each other. The additional fitting wall portion 202 is inserted, along the second direction D2, into a corresponding one of the additional fitted portions 201 such that the additional fitting wall portion 202 fits in the corresponding one of the additional fitted portions 201.

The wall surface 205 of the additional fitting wall portion 202 includes a second additional locking surface 212. When the additional fitting wall portion 202 fits in the additional fitted portion 201, the second additional locking surface 212 faces the first additional locking surface 211 of the additional fitted portion 201 in the first direction D1. When the support frame 100D receives an impact from the front side, the second additional locking surface 212 is received by the first additional locking surface 211, so that a rearward movement of the additional member 190 is restricted. Accordingly, it is possible to restrain the support frame 100D from deforming or being disassembled due to such an impact.

In the fourth embodiment, in a state where the first additional locking surface 211 makes surface contact with the second additional locking surface 212, the additional member 190 is joined to the second member 120D or the third member 130D. This accordingly restrains such a situation that, when the support frame 100D receives an impact from the front side as described above, the additional member 190 is displaced rearward, and a joining portion between the additional member 190 and the second member 120D or the third member 130D is broken.

As described above, with the support frame 100D of the fourth embodiment, by adding the additional members 190, the support frame 100D can easily adapt to the dimension, in the second direction D2, of the fuel cell 11 to be placed on the support frame 100D or the width dimension of the vehicle 10 in which the support frame 100D is to be provided. Further, similarly to the configuration in the connecting portion 140C, the configuration of the additional connecting portion 200 restrains a decrease in the strength of the support frame 100D with respect to an impact from the front side due to the addition of the additional member 190. In addition, with the support frame 100D of the fourth embodiment and the vehicle 10 including the support frame 100D, it is possible to yield various effects described in the above embodiments.

5. Modifications

Various configurations described in the above embodiments can be modified as follows, for example. Each of the modifications described below is positioned as an example for carrying out the technique of this disclosure similarly to the above embodiments.

Modification 1

Figure 14:
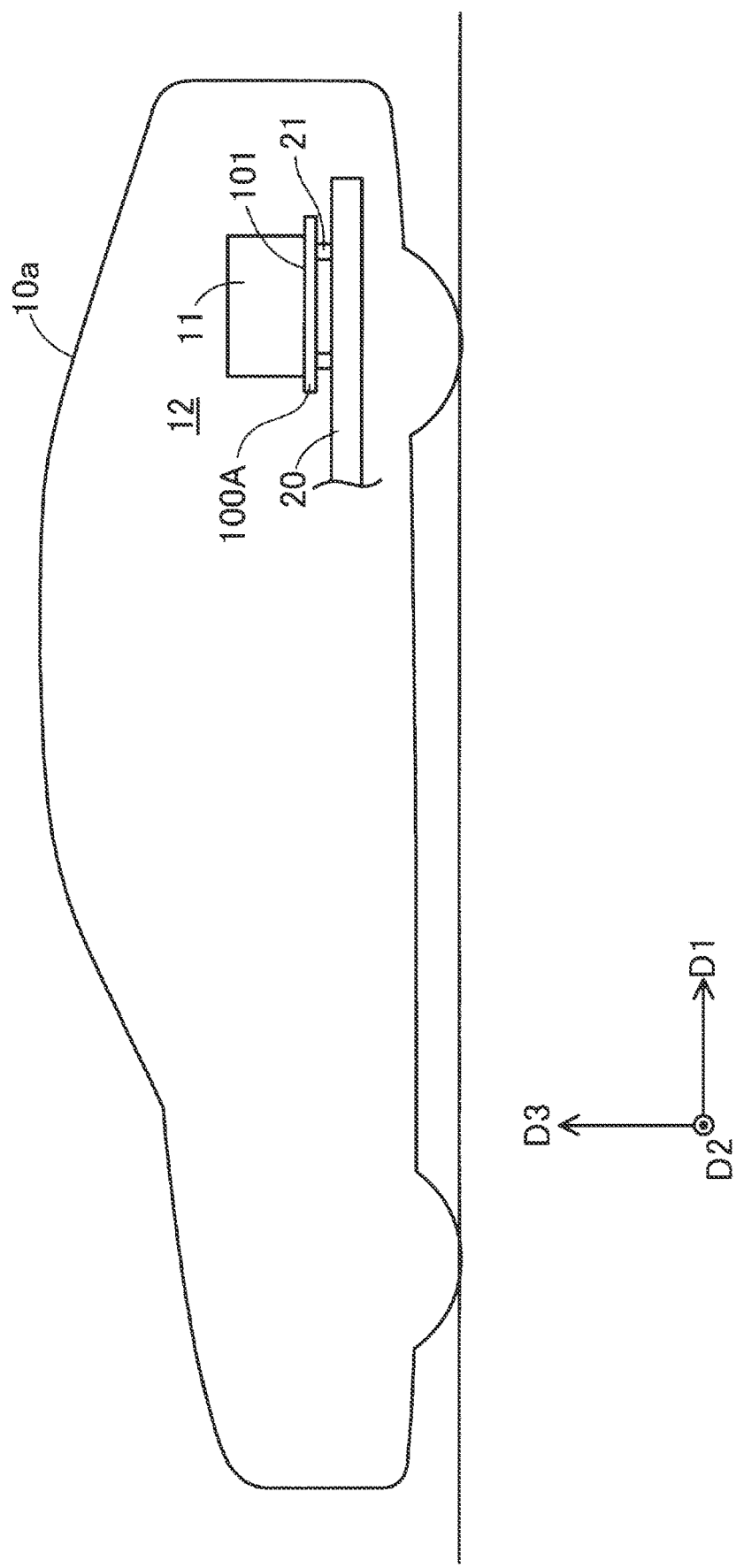
FIG. 14 is a schematic view illustrating a configuration of a vehicle according to a modification.

Now refer to FIG. 14. As illustrated in FIG. 14, the support frame 100A of the first embodiment may be placed at a position close to the rear side of the vehicle 10 in a state where the first direction D1 corresponds to a direction directed rearward from the front side in the vehicle 10. With this configuration, when the support frame 100A receives an impact from the rear side of the vehicle 10, the configuration of the connecting portion 140 restrains the first member 110 of the support frame 100A from being displaced forward relative to the second member 120 and the third member 130. Similarly, the support frames 100B, 100C, 100D of the above embodiments may be also provided at a position close to the rear side of the vehicle 10.

Modification 2

In the first embodiment and the second embodiment, the first member 110 may be provided with the fitted portions 141 so that the first member 110 serves as the first connecting member 151, and the second member 120 and the third member 130 may be provided with the fitting portions 142 so that the second member 120 and the third member 130 serve as the second connecting members 152. Similarly, in the third embodiment and the fourth embodiment, the first member 110C may be provided with the fitted portions 141C so that the first member 110C serves as the first connecting member 151C, and the second member 120C and the third member 130C may be provided with the fitting wall portions 142C so that the second member 120C and the third member 130C serve as the second connecting members 152C.

Modification 3

In each of the above embodiments, the members 110, 120, 130 may not have the same dimension in the third direction D3 and may have different dimensions. Further, the second member 120, 120C, 120D may have different dimensions in the first direction D1 or the second direction D2 from the third member 130, 130C, 130D.

Modification 4

In each of the above embodiments, the first connecting member 151, 151C may be joined to the second connecting member 152, 152C in a state where a gap is provided between the first locking surface 143 and the second locking surface 144. Further, another member may be provided between the first locking surface 143 and the second locking surface 144.

Modification 5

The fifth member 170 and the sixth member 180 described in the second embodiment or the additional member 190 described in the fourth embodiment may be added to the support frame 100A of the first embodiment. The configuration of the connecting portion 140C in the third embodiment may be applied to the support frame 100A of the first embodiment, instead of the configuration of the connecting portion 140. In the support frame 100D of the fourth embodiment, the additional connecting portion 200 may be configured similarly to the connecting portion 140 described in the first embodiment. In the support frame 100D of the fourth embodiment, either one of the additional member 190 on the second member 120D side and the additional member 190 on the third member 130D side may be omitted.

Modification 6

In each of the above embodiments, the fitted portion 141, 141C and the fitting portion 142 or the fitting wall portion 142C may be provided only on the mounting surface 101 side or may be provided only on the back surface opposite to the mounting surface 101. In the first embodiment and the second embodiment, either one of the extending portions 124a, 124b may be omitted.

6. Others

The technique of this disclosure is not limited to the above embodiments, examples, and modifications, and is achievable in various configurations within a range that does not deviate from the gist of the disclosure. For example, the technical features of the embodiments, the examples, and the modifications, corresponding to the technical features of the aspects described in SUMMARY, can be replaced or combined appropriately, in order to resolve some or all of the problems described above or in order to achieve some or all of the above effects. Further, the technical features can be deleted appropriately if the technical features have been described as unessential in the present specification or if the technical features have not been described as essential in the present specification.

What is claimed is:
1. A support frame used in a vehicle equipped with a fuel cell and configured to support the fuel cell, the support frame comprising:
 a first member having a surface constituting a part of a mounting surface on which the fuel cell is to be placed, the surface extending along a first direction and a second direction perpendicular to the first direction;
 a second member joined to a first side of the first member in the second direction, the second member having a surface constituting a part of the mounting surface and extending along the first direction and the second direction; and a third member joined to a second side of the first member in the second direction, the third member having a surface constituting a part of the mounting surface and extending along the first direction and the second direction, wherein a position where the first member is connected to the second member and a position where the first member is connected to the third member are defined as connecting portions;

in the connecting portions, the first member is structurally connected to the second member by fitting in a direction along the second direction, and the first member is structurally connected to the third member by fitting in the direction along the second direction;

one of members connected to each other in each of the connecting portions is defined as a first connecting member and the other one of the members is defined as a second connecting member;

a side end portion of the first connecting member on a side facing the second connecting member is provided with an extending portion;

the extending portion has a flat shape extending along the first direction and the second direction and overlaps with a part of the second connecting member in a third direction perpendicular to the first direction and the second direction;

the extending portion includes a fitted portion constituted by a recessed portion formed by cutting a part of the extending portion along the second direction; and a side end portion of the second connecting member on a side facing the first connecting member is provided with a fitting portion configured to fit in the fitted portion in the direction along the second direction.

2. The support frame according to claim 1, wherein:
the fitted portion includes a first locking surface facing toward the first direction;
the fitting portion includes a second locking surface facing the first locking surface in the first direction;
a width of the fitted portion in the first direction is larger than a width of the fitting portion in the first direction; and
the first connecting member is joined to the second connecting member in a state where the first locking surface makes contact with the second locking surface.

3. The support frame according to claim 1, wherein:
the extending portion is a first extending portion;
the side end portion of the first connecting member on the side facing the second connecting member is further provided with a second extending portion;
the second extending portion is aligned with the first extending portion in the third direction and has a flat shape extending along the first direction and the second direction;

the second connecting member includes a pair of side wall portions provided on opposite sides of the fitting portion in the first direction, the side wall portions being configured to fit between the first extending portion and the second extending portion and facing a peripheral part of the fitted portion in the third direction;
the fitting portion has stepped surfaces projecting from the side wall portions along the third direction; and
the fitted portion has an inner peripheral surface facing a part of the stepped surfaces in the first direction.

4. The support frame according to claim 3, wherein a thickness of the first extending portion in the third direction is equal to a height of the stepped surfaces relative to the side wall portions in the third direction.

5. The support frame according to claim 1, wherein:
the side end portion of the second connecting member on the side facing the first connecting member is provided with a cover wall portion;
the cover wall portion has a plate shape extending along the first direction and the second direction and overlaps with the extending portion in the third direction such that the cover wall portion covers the extending portion and the fitted portion;
the fitting portion has a wall surface intersecting with the cover wall portion and extending along the second direction and the third direction, and is constituted by a fitting wall portion; and
the fitted portion has an inner peripheral surface facing a part of the wall surface of the fitting wall portion in the first direction.

6. The support frame according to claim 5, wherein a root part of the extending portion is provided with a stepped portion facing a distal surface of the cover wall portion in the second direction and having a height equal to a thickness of the cover wall portion in the third direction.

7. The support frame according to claim 1, wherein an additional member constituting a part of the mounting surface and having an upper wall surface extending along the first direction and the second direction is connected to at least either of a side of the second member, the side opposite to a side facing the first member, and a side of the third member, the side opposite to a side facing the first member.

8. A vehicle comprising:
the support frame according to claim 1; and
the fuel cell, wherein:
the support frame is placed at a position close to a front side or a rear side of the vehicle such that the first direction corresponds to a front-rear direction of the vehicle, and the second direction corresponds to a right-left direction of the vehicle; and
the fuel cell is fixed, on the mounting surface, at a position inwardly from ends of the support frame in the first direction and the second direction.

* * * * *